(12) United States Patent
Yeo et al.

(10) Patent No.: US 8,184,357 B2
(45) Date of Patent: May 22, 2012

(54) DISPLAY ELEMENT

(75) Inventors: Jong-Souk Yeo, Corvallis, OR (US);
Zhang-Lin Zhou, Palo Alto, CA (US);
Pavel Kornilovich, Corvalis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 12/815,993

(22) Filed: Jun. 15, 2010

(65) Prior Publication Data

US 2011/0304902 A1 Dec. 15, 2011

(51) Int. Cl.
*G02B 26/00* (2006.01)
(52) U.S. Cl. ........................ 359/290; 359/296
(58) Field of Classification Search .............. 359/290, 359/296
See application file for complete search history.

(56) References Cited

U.S. PATENT DOCUMENTS

| 6,130,774 | A | 10/2000 | Albert et al. | |
| 6,741,385 | B2 * | 5/2004 | Ikeda et al. | 359/296 |
| 6,781,745 | B2 | 8/2004 | Chung et al. | |
| 6,822,783 | B2 | 11/2004 | Matsuda et al. | |
| 7,227,525 | B2 | 6/2007 | Kishi | |
| 2003/0011869 | A1 * | 1/2003 | Matsuda et al. | 359/296 |
| 2005/0012881 | A1 | 1/2005 | Liang et al. | |
| 2006/0203327 | A1 * | 9/2006 | Yasuda | 359/296 |
| 2009/0213452 | A1 | 8/2009 | Lin et al. | |
| 2009/0273827 | A1 | 11/2009 | Lin et al. | |

FOREIGN PATENT DOCUMENTS

WO     WO 0077570 A1 * 12/2000

* cited by examiner

*Primary Examiner* — Ricky Mack
*Assistant Examiner* — Mahidere Sahle

(57) ABSTRACT

In one embodiment, a display element includes a first electrode, a second electrode, and a display cell defined by a dielectric material between the first electrode and the second electrode. The display cell includes a narrower portion adjacent the first electrode and a wider portion. The narrower portion has a first cross-sectional area and the wider portion has a second cross-sectional area. A cross-sectional area of the display cell gradually transitions between the first cross-sectional area and the second cross-sectional area. The display element includes a fluid with colorants within the display cell.

20 Claims, 17 Drawing Sheets

DISPLAY ELEMENT

BACKGROUND

Electrophoresis is the translation of charged objects in a fluid in response to an electric field. Electrophoretic inks are useful as a medium to enable bistable, low power types of displays. Conventional electrophoretic displays feature either black and white states (by exchanging white and black charged colorant particles at the top of the display cell) or white and colored states (by moving white colorant particles in a dyed fluid up and down electrophoretically). These conventional electrophoretic displays cannot provide a clear state and cannot be easily extended to provide full-color displays. An electrokinetic display enables functionalities such as a transparent state, dynamic grayscale, switching speed, and potential pigment universality. There remain, however, technical challenges in identifying ink components that can stably operate in the electrokinetic regime.

DETAILED DESCRIPTION

Figure 1A:
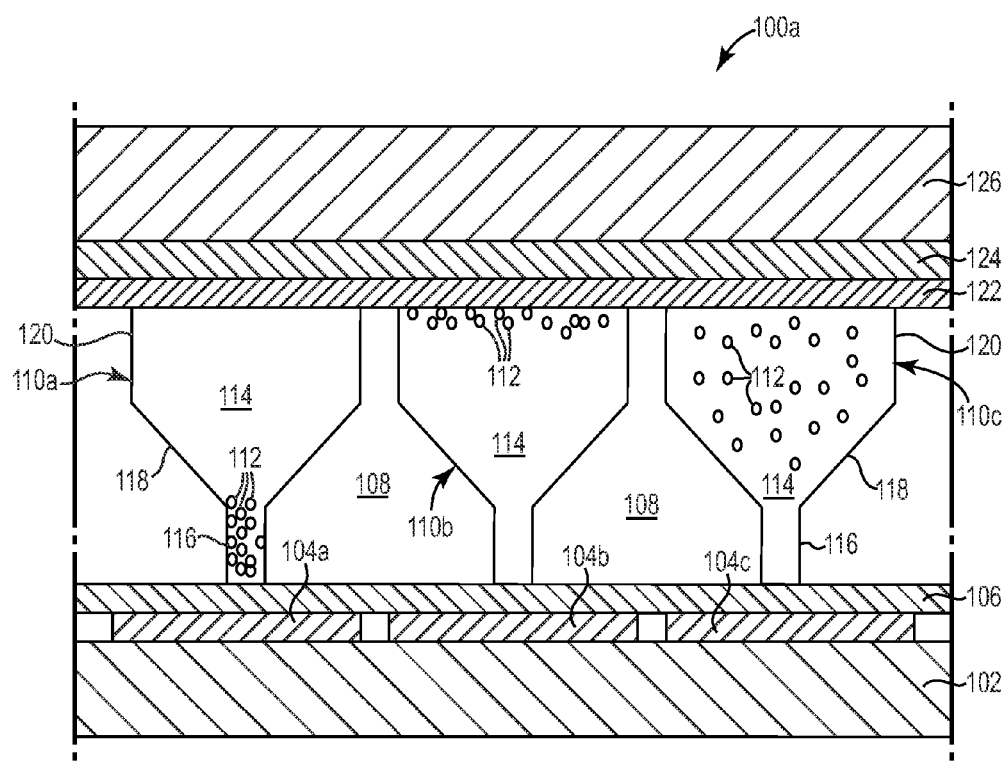
FIG. 1A illustrates a cross-sectional view of one embodiment of an electro-optical display.

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term "grayscale" applies to both black and white images and monochromatic color images. Grayscale refers to an image including different shades of a single color produced by controlling the density of the single color within a given area of a display.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electro-optical display" is an information display that forms visible images using one or more of electrophoresis, electro-convection, electro-osmosis, electrochemical interactions, and/or other electrokinetic phenomena.

Embodiments provide bi-state and/or tri-state electrophoretic display cells having a three-dimensional architecture for compacting charged colorant particles within the display cells. A bi-state display cell having a dark state and a clear state is provided by an electronic ink with charged colorant particles in an optically transparent fluid. A clear state is achieved when the colorant particles are compacted and a colored state is achieved when the colorant particles are spread. An electronic ink with charged white particles in a colored fluid enables white and spot-color states, with the color of the colored state depending on the color of the fluid. The ink fluid is colored by a dye, nanoparticle colorants, pigments, or other suitable colorants. A white state is achieved when the white particles are spread and a colored state is achieved when the white particles are compacted. By combining the white particles in the colored fluid with a colored resin on the back of the display cell, a tri-state display cell is provided.

A purely electrophoretic display cell includes a three-dimensional architecture to provide a clear optical state. In this architecture, the geometrical shape of the display cell has narrowing portions in which electrophoretically translated colorant particles compact in response to appropriate bias conditions applied to driving electrodes on opposite sides of the display cell. The three-dimensional structure of the display cell introduces additional control of electrophoretically moving colorant particles. As a result, desired functionalities can be achieved with a relatively well developed and more stable electrophoretic ink. The driving electrodes are passivated with a dielectric layer, thus eliminating the possibility of electrochemical interactions through the driving electrodes from direct contact with the electrophoretic ink. In other embodiments, the driving electrodes are not passivated, thus allowing electrochemical interactions with the electrophoretic ink.

FIG. 1A illustrates a cross-sectional view of one embodiment of an electro-optical display 100a. Electro-optical display 100a includes a first substrate 102, first electrodes 104a-104c, a first dielectric passivation layer 106, a structured dielectric layer 108, display cells 110a-110c, a second dielectric passivation layer 122, a second electrode 124, and a second substrate 126. Each display cell 110a-110c is filled with a carrier fluid 114 with colorant particles 112. While three display cells 110a-110c are illustrated in FIG. 1A, in other embodiments, electro-optical display 100a may include any suitable number of display cells.

First substrate 102 is parallel to and opposite second substrate 126. In one embodiment, first substrate 102 and/or second substrate 126 include an optically clear or transparent material, such as plastic (e.g., polyethylene terephthalate (PET)), glass, or other suitable material. In another embodiment, one of first substrate 102 and second substrate 126 is coated with or comprises a reflective material. In yet another embodiment, substrate 102 is an opaque material. In still another embodiment, a light scatterer is formed on substrate 102.

First electrodes 104a-104c are parallel to and opposite second electrode 124. First electrodes 104a-104c are segments of a segmented or pixelated conductor formed on substrate 102. Second electrode 124 is a continuous, blanket, or solid plate electrode formed on second substrate 126. In other embodiments, second electrode 124 is segmented or pixelated similar to first electrodes 104a-104c. First electrodes 104a-104c and/or second electrode 124 may be transparent or opaque. In one embodiment, first electrodes 104a-104c and/or second electrode 124 are formed from a film of transparent conductive material. The transparent conductive material can include carbon nanotube layers, silver nanowire layers, metal meshes, a transparent conducting oxide such as ITO (Indium Tin Oxide), or a transparent conducting polymer such as PEDOT (poly 3,4-ethylenedioxythiophene). Other embodiments use other materials that provide suitable conductivity and transparency for electro-optical display 100a.

First dielectric passivation layer 106 is parallel to and opposite second dielectric passivation layer 122. First dielectric passivation layer 106 is formed over first electrodes 104a-104c to electrically isolate first electrodes 104a-104c from display cells 110a-110c. Second dielectric passivation layer 122 is formed over second electrode 124 to electrically isolate second electrode 124 from display cells 110a-110c. First dielectric passivation layer 106 and/or second dielectric passivation layer 122 include a reflective dielectric material or an optically clear or transparent dielectric material.

Structured dielectric layer 108 extends between first passivation layer 106 and second passivation layer 122 and defines each display cell 110a-110c. In one embodiment, structured dielectric layer 108 includes a transparent dielectric resin, a white dielectric resin, or a white dielectric reflector. Dielectric layer 108 is structured using an embossing process, a photolithography process, a laser micromachining process, or another suitable process.

In this embodiment, dielectric layer 108 defines each display cell 110a-110c to have mirror symmetrical first sidewalls 116, second sidewalls 118, and third sidewalls 120. First sidewalls 116 are adjacent to and perpendicular to first electrodes 104a-104c. Third sidewalls 120 are adjacent to and perpendicular to second electrode 124. Second sidewalls 118 are sloped and connect first sidewalls 116 to third sidewalls 120. First sidewalls 116 define a narrower recess or reservoir portion of each display cell 110a-110c for compacting colorant particles 112 adjacent to first electrodes 104a-104c. Second sidewalls 118 are sloped to guide colorant particles 112 into the reservoir portion of each display cell 110a-110c. Third sidewalls 120 define a wider portion of each display cell 110a-110c for spreading colorant particles 112.

The cross-sectional area of each display cell 110a-110c between third sidewalls 120 is greater than the cross-sectional area of each display cell 110a-110c between first sidewalls 116. The cross-sectional area of each display cell 110a-110c between second sidewalls 118 is reduced or gradually transitions from the cross-sectional area of each display cell 110a-110c between third sidewalls 120 to the cross-sectional area of each display cell 110a-110c between first sidewalls 116. The clear aperture of electro-optical display 100a is based on the cross-sectional area of the reservoir portions of each display cell 110a-110c and the distance between sidewalls 120 of adjacent display cells, such as the distance between sidewall 120 of display cell 110a and sidewall 120 of display cell 110b.

Carrier fluid 114 within each display cell 110a-110c includes either polar fluids (e.g., water) or nonpolar fluids (e.g., dodecane). In other embodiments, anisotropic fluids such as liquid crystal is used. The fluid may include surfactants such as salts, charging agents, stabilizers, and dispersants. In one embodiment, the surfactants provide a fluid that is an electrolyte that is able to sustain current by ionic mass transport. In the embodiment illustrated in FIG. 1A, carrier fluid 114 is a clear fluid.

Colorant particles 112 in carrier fluid 114 are comprised of a charged material. The colorant particle material should be able to hold a stable charge indefinitely so that repeated operation of the display does not affect the charge on the colorant particles. Colorant particle materials having a finite ability to hold a stable charge, however, can be used in accordance with the various embodiments while they maintain their charge. Colorant particles 112 may have a size between several nanometers and several microns and have the property of changing the spectral composition of the incident light by absorbing and/or scattering certain portions of the spectrum. As a result, the particles appear colored, which provides a desired optical effect. In other embodiments, the colorant can be a dye, which is comprised of single absorbing molecules. In the embodiment illustrated in FIG. 1A, colorant particles 112 are positively charged.

Each display cell 110a-110c illustrated in FIG. 1A is in a different optical state based on the bias conditions applied to first electrodes 104a-104c and second electrode 124. Display cell 110a is in a clear optical state. Since colorant particles 112 are positively charged in this embodiment, the clear optical state is provided by applying a negative bias to first electrode 104a relative to a reference bias applied to second electrode 124. The negative bias applied to first electrode 104a provides an electrophoretic pull that attracts positively charged colorant particles 112. The sloped sidewalls 118 of display cell 110a induce forces tangential to the slope from the electrophoretic pull. As a result, colorant particles 112 are guided by second sidewalls 118 of display cell 110a into the narrower portion of display 110a and compacted on the surface of first dielectric passivation layer 106 adjacent to first electrode 104a. With colorant particles 112 in clear fluid 114 compacted on the surface of first dielectric passivation layer 106 in the narrower portion of display cell 110a, the clear optical state is achieved.

The positively charged colorant particles 112 can be electrophoretically and convectively moved to first electrode 104a and held there by the negative bias applied to first electrode 104a relative to second electrode 124. In one embodiment, the convective flow is a transient effect caused by the ionic mass transport in carrier fluid 114, without charge transfer between carrier fluid 114 and first electrode 104a. In this case, the convective flow proceeds for a finite amount of time and facilitates the compaction of colorant particles 112 on first dielectric passivation layer 106 adjacent to first electrode 104a. After compaction, colorant particles 112 are held on first dielectric passivation layer 106 by electrostatic forces generated by a coupling with first electrode 104a.

Display cell 110b is in a first color optical state having the color of colorant particles 112. The first color optical state is provided by applying a positive bias to first electrode 104b relative to the reference bias applied to second electrode 124. The positive bias applied to first electrode 104b repels positively charged colorant particles 112 while the reference bias applied to second electrode 124 attracts positively charged colorant particles 112. As a result, colorant particles 112 are compacted on the surface of second dielectric passivation layer 122 adjacent to second electrode 124. With colorant particles 112 in clear fluid 114 compacted on the surface of second dielectric passivation layer 122, the first color optical state having the color of colorant particles 112 is achieved.

Display cell 110c is in a second color spread optical state having the color of colorant particles 112. The second color spread optical state is provided by applying the reference bias or no bias to first electrode 104c relative to the reference bias applied to second electrode 124. The reference bias or no bias applied to first electrode 104c spreads colorant particles 112 between first electrode 104c and second electrode 124 within display cell 110c. With colorant particles 112 in clear fluid 114 spread throughout display cell 110c, the second color spread optical state having the color of colorant particles 112 is achieved.

Figure 1B:
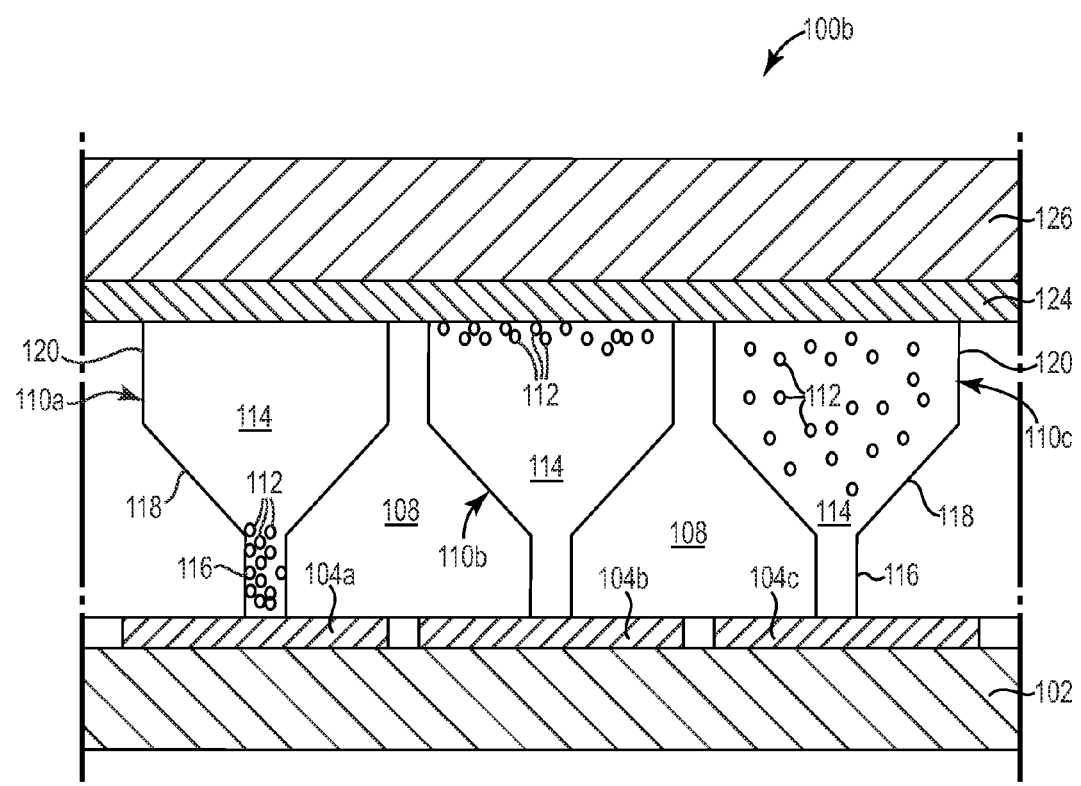
FIG. 1B illustrates a cross-sectional view of another embodiment of an electro-optical display.

FIG. 1B illustrates a cross-sectional view of another embodiment of an electro-optical display 100b. Electro-optical display 100b is similar to electro-optical display 100a previously described and illustrated with reference to FIG. 1A, except that in electro-optical display 100b first dielectric passivation layer 106 and second dielectric passivation layer 122 are excluded. In the embodiment illustrated in FIG. 1B, first electrodes 104a-104c and second electrode 124 directly contact carrier fluid 114 of display cells 110a-110c, respectively.

Electro-optical display 100b operates similarly to electro-optical display 100a and includes the clear optical state as illustrated by display cell 110a, the first color optical state as illustrated by display cell 110b, and the second color spread optical state as illustrated by display cell 110c as previously described and illustrated with reference to FIG. 1A. In electro-optical display 100b, however, the convective flow is induced by ionic mass transport in carrier fluid 114 and by charge transfer between carrier fluid 114 and first electrodes 104a-104c and second electrode 124. The charge transfer can occur when the carrier fluid is coupled to the electrodes either through direct contact with the electrodes or separated from the electrodes by an intermediate layer including one or more materials. In the latter case, charge transfer is facilitated by the internal electrical conductivity of the intermediate layer, either volumetric or via pinholes and other defects.

While the following embodiments of electro-optical displays include first dielectric passivation layer 106 and second dielectric passivation layer 122, the following embodiments of the electro-optical displays are also applicable to similar displays in which the passivation layers are excluded as illustrated in FIG. 1B.

Figure 1C:
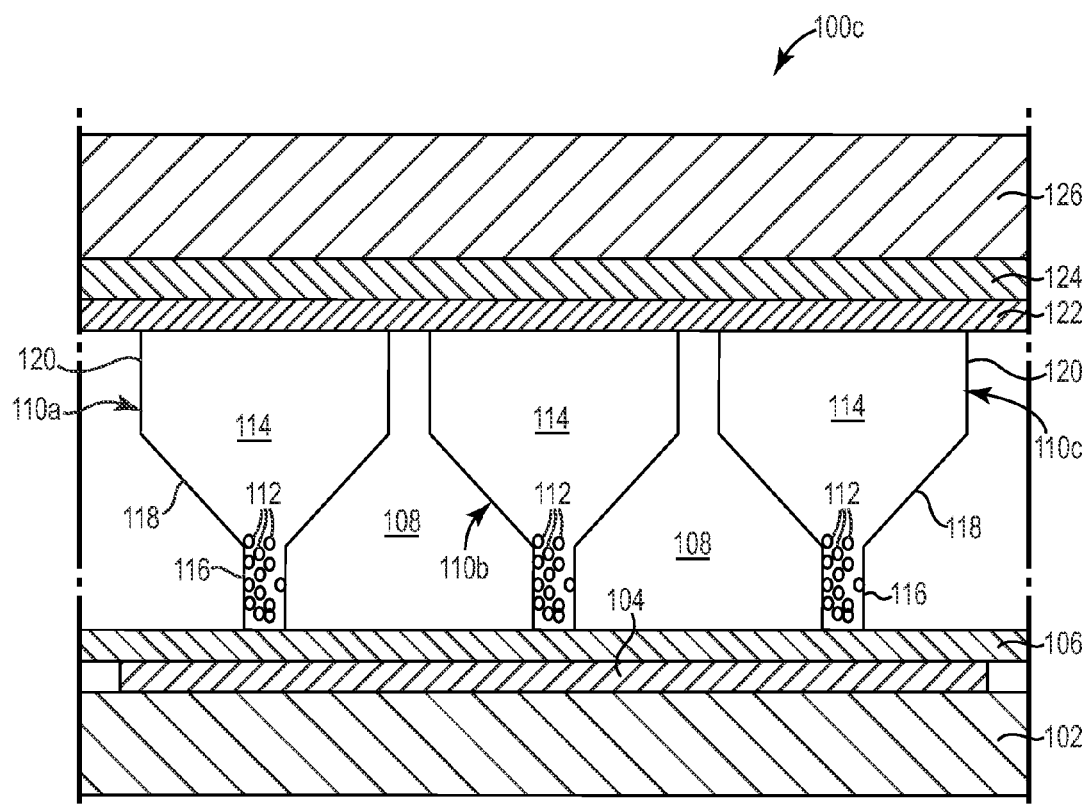
FIG. 1C illustrates a cross-sectional view of another embodiment of an electro-optical display.

FIG. 1C illustrates a cross-sectional view of another embodiment of an electro-optical display 100c. Electro-optical display 100c is similar to electro-optical display 100a previously described and illustrated with reference to FIG. 1A, except that in electro-optical display 100c first electrodes 104a-104c are replaced by a single first electrode 104. First electrode 104 is adjacent to and controls display cells 110a-110c. While first electrode 104 is illustrated as controlling three display cells 110a-110c in this embodiment, in other embodiments first electrode 104 can be used to control any suitable number of display cells.

In the embodiment illustrated in FIG. 1C, display cells 110a-110c are in the clear optical state. The clear optical state is provided by applying a negative bias to first electrode 104 relative to the reference bias applied to second electrode 124. The negative bias applied to first electrode 104 attracts positively charged colorant particles 112. Colorant particles 112 are guided by second sidewalls 118 of display cells 110a-110c into the narrower portions of display cells 110a-110c and compacted on the surface of first dielectric passivation layer 106 adjacent to first electrode 104. The first color optical state and the second color spread optical state can also be achieved by electro-optical display 110c by applying a suitable bias to first electrode 104 relative to second electrode 124 as previously described and illustrated with reference to FIG. 1A.

Figure 2:
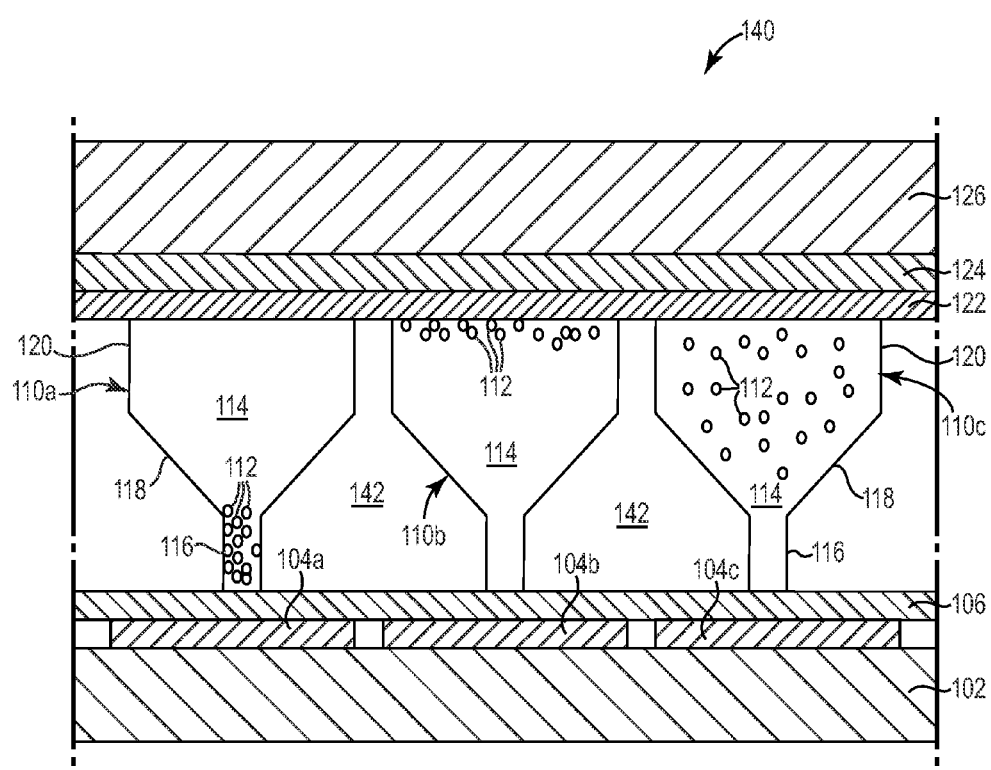
FIG. 2 illustrates a cross-sectional view of another embodiment of an electro-optical display.

FIG. 2 illustrates a cross-sectional view of another embodiment of an electro-optical display 140. Electro-optical display 140 is similar to electro-optical display 100a previously described and illustrated with reference to FIG. 1A, except that in electro-optical display 140 structured dielectric layer 142 replaces structured dielectric layer 108. In the embodiment illustrated in FIG. 2, structured dielectric layer 142 includes a colored resin. The resin is colored by embedding colorants such as dyes, pigments, other suitable colorants, or combinations thereof in the resin.

Electro-optical display 140 operates similarly to electro-optical display 100a and includes the clear optical state as illustrated by display cell 110a, the first color optical state as illustrated by display cell 110b, and the second color spread optical state as illustrated by display cell 110c as previously described and illustrated with reference to FIG. 1A. Electro-optical display 140, however, due to the dyed resin of structured dielectric layer 142 is the color of the dyed resin in the clear optical state as illustrated by display cell 110a.

Figure 3:
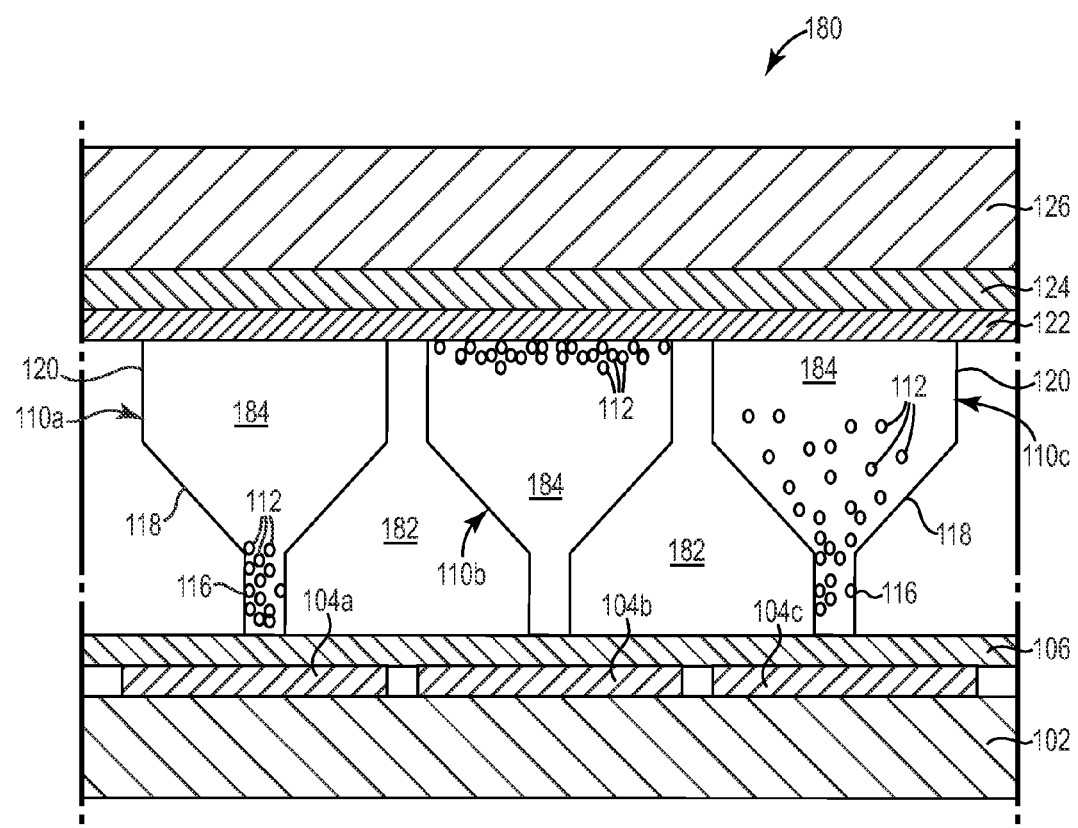
FIG. 3 illustrates a cross-sectional view of another embodiment of an electro-optical display.

FIG. 3 illustrates a cross-sectional view of another embodiment of an electro-optical display 180. Electro-optical display 180 is similar to electro-optical display 100a previously described and illustrated with reference to FIG. 1A, except that in electro-optical display 180 structured dielectric layer 182 replaces structured dielectric layer 108 and carrier fluid 184 replaces carrier fluid 114. In the embodiment illustrated in FIG. 3, structured dielectric layer 182 includes a white resin or a white reflector, carrier fluid 184 is dyed, and positively charged colorant particles 112 are white. In other embodiments, colorant particles 112 are negatively charged.

Each display cell 110a-110c illustrated in FIG. 3 is in a different optical state based on the bias conditions applied to first electrodes 104a-104c and second electrode 124. Display cell 110a is in a dye color optical state having the color of carrier fluid 184. For positively charged colorant particles 112, the dye color optical state is provided by applying a negative bias to first electrode 104a relative to a reference bias applied to second electrode 124. The negative bias applied to first electrode 104a attracts the white positively charged colorant particles 112. White colorant particles 112 are guided by second sidewalls 118 of display cell 110a into the narrower portion of display cell 110a and compacted on the surface of first dielectric passivation layer 106 adjacent to first electrode 104a. With white colorant particles 112 in dyed fluid 184 compacted on the surface of first dielectric passivation layer 106 in the narrower portion of display cell 110a, the dye color optical state having the color of carrier fluid 184 is achieved.

Display cell 110b is in a white optical state. The white optical state is provided by applying a positive bias to first electrode 104b relative to the reference bias applied to second electrode 124. The positive bias applied to first electrode 104b repels the white positively charged colorant particles 112 while the reference bias applied to second electrode 124 attracts the white positively charged colorant particles 112. As a result, white colorant particles 112 are compacted on the surface of second passivation layer 122 adjacent to second electrode 124. With white colorant particles 112 in dyed fluid 184 compacted on the surface of second dielectric passivation layer 122, the white optical state having the color of white colorant particles 112 is achieved.

Display cell 110c is in a grayscale color optical state. The grayscale color optical state is provided by applying pulses to first electrode 104c relative to the reference bias applied to second electrode 124. The pulses applied to first electrode 104c spread white colorant particles 112 between first electrode 104c and second electrode 124 within display cell 110c. The amount of colorant particles 112 that are repelled by first electrode 104c and spread from the narrower portion to the wider portion of display cell 110c is based on the amplitude and/or width of the pulses applied to first electrode 104c. With a controlled amount of white colorant particles 112 in dyed fluid 184 spread throughout display cell 110c, the grayscale color optical state having a color based on the combination of the color of dyed fluid 184 and white colorant particles 112 is achieved. The level of grayscale can be adjusted by modifying the amplitude and/or width of the pulses applied to first electrode 104c.

Figure 4:
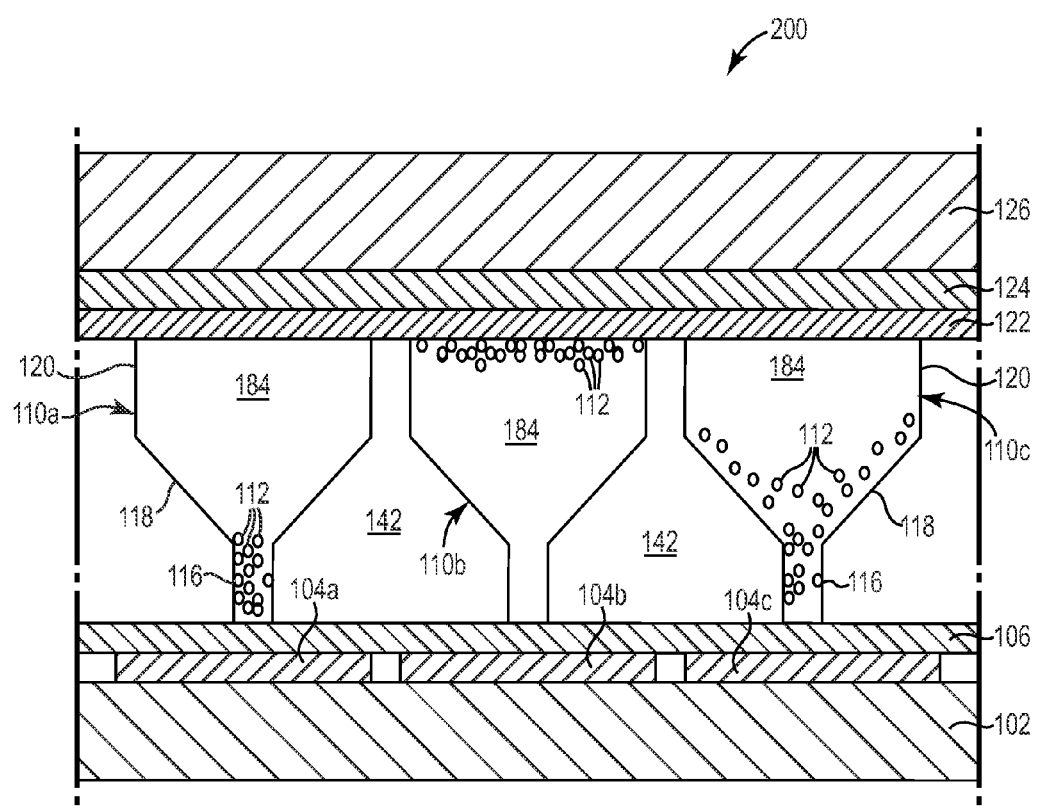
FIG. 4 illustrates a cross-sectional view of another embodiment of an electro-optical display.

FIG. 4 illustrates a cross-sectional view of another embodiment of an electro-optical display 200. Electro-optical display 200 is similar to electro-optical display 180 previously described and illustrated with reference to FIG. 3, except that in electro-optical display 200 structured dielectric layer 142 replaces structured dielectric layer 182. In the embodiment illustrated in FIG. 4, structured dielectric layer 142 includes a dyed resin.

Each display cell 110a-110c illustrated in FIG. 4 is in a different optical state based on the bias conditions applied to first electrodes 104a-104c and second electrode 124. Display cell 110a is in a mixed color optical state having a color based on the combination of the color of dyed fluid 184 and the color of structured dielectric layer 142. The mixed color optical state is provided by applying a negative bias to first electrode 104a relative to a reference bias applied to second electrode 124. The negative bias applied to first electrode 104a attracts the white positively charged colorant particles 112. White colorant particles 112 are guided by second sidewalls 118 of display cell 110a into the narrower portion of display cell 110a and compacted on the surface of first dielectric passivation layer 106 adjacent to first electrode 104a. With white colorant particles 112 in dyed fluid 184 compacted on the surface of first dielectric passivation layer 106 in the narrower portion of display cell 110a, the mixed color optical state having the color of the combination of dyed fluid 184 and structured dielectric layer 142 is achieved.

Display cell 110b is in a white optical state. The white optical state is provided by applying a positive bias to first electrode 104b relative to the reference bias applied to second electrode 124. The positive bias applied to first electrode 104b repels the white positively charged colorant particles 112 while the reference bias applied to second electrode 124 attracts the white positively charged colorant particles 112. As a result, white colorant particles 112 are compacted on the surface of second passivation layer 122 adjacent to second electrode 124. With white colorant particles 112 in dyed fluid 184 compacted on the surface of second dielectric passivation layer 122, the white optical state having the color of white colorant particles 112 is achieved.

Display cell 110c is in a dye color optical state. The dye color optical state is provided by applying pulses to first electrode 104c relative to the reference bias applied to second electrode 124. The pulses applied to first electrode 104c spread white colorant particles 112 over second sidewalls 118 of display cell 110c. The amount of colorant particles 112 that are spread from the narrower portion to sidewalls 118 of display cell 110c is based on the amplitude and/or width of the pulses applied to first electrode 104c. With a controlled amount of white colorant particles 112 in dyed fluid 184 spread onto sidewalls 118 of display cell 110c, the dye color optical state having the color of carrier fluid 184 is achieved. In another embodiment, the white colorant particles are replaced with black colorant particles such that electro-optical display 200 can provide a dye color optical state, a black optical state, and a mixed color optical state.

Figure 5:
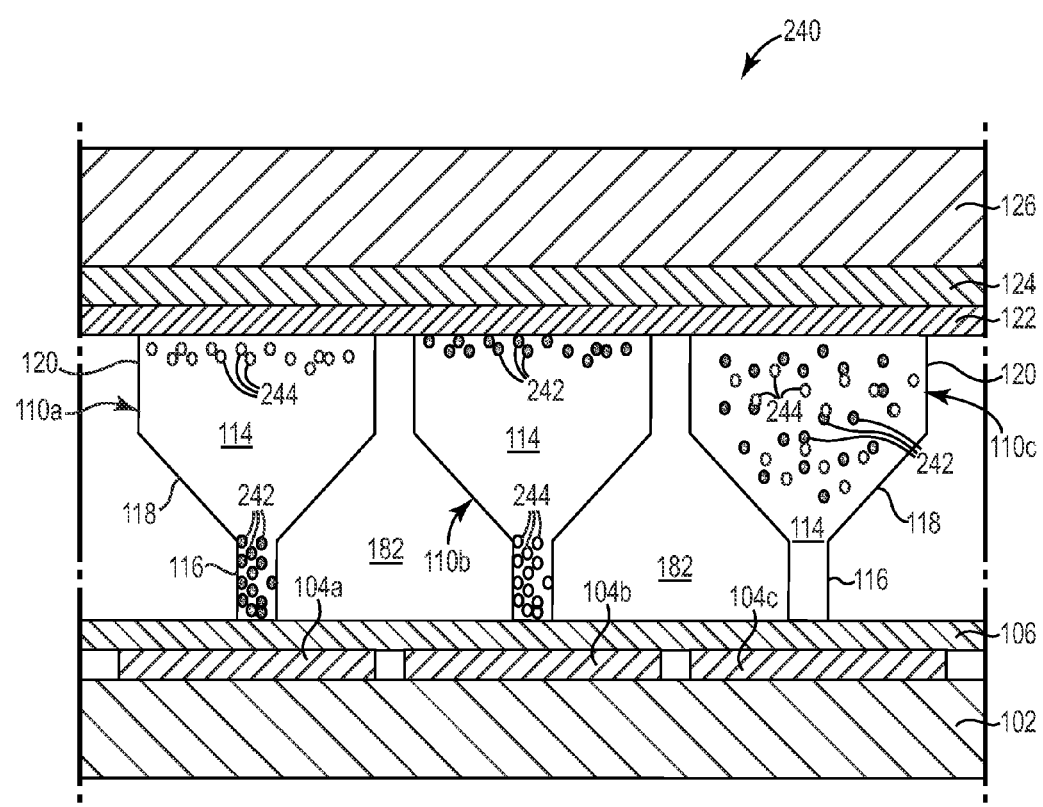
FIG. 5 illustrates a cross-sectional view of another embodiment of an electro-optical display.

FIG. 5 illustrates a cross-sectional view of another embodiment of an electro-optical display 240. Electro-optical display 240 is similar to electro-optical display 100a previously described and illustrated with reference to FIG. 1A, except that in electro-optical display 240 structured dielectric layer 182 replaces structured dielectric layer 108 and dual colorant particles 242 and 244 replace colorant particles 112. In the specific embodiment illustrated in FIG. 5, charged colorant particles 242 and 244 in dual colorant ink can be oppositely charged and each provides a different color, such as cyan and magenta. Colorants in dual colorant ink can be any combination of primary subtractive or additive colorants, such as cyan, magenta, yellow, black, red, green, blue, and white.

Each display cell 110a-110c illustrated in FIG. 5 is in a different optical state based on the bias conditions applied to first electrodes 104a-104c and second electrode 124. Display cell 110a is in a first color optical state having the color of negatively charged colorant particles 244. The first color optical state is provided by applying a negative bias to first electrode 104a relative to a reference bias applied to second electrode 124. The negative bias applied to first electrode 104a attracts positively charged colorant particles 242 and repels negatively charged colorant particles 244. Colorant particles 242 are guided by second sidewalls 118 of display cell 110a into the narrower portion of display cell 110a and compacted on the surface of first dielectric passivation layer 106 adjacent to first electrode 104a.

The reference bias applied to second electrode 124 attracts colorant particles 244. Colorant particles 244 are compacted on the surface of second passivation layer 122 adjacent to second electrode 124. With colorant particles 242 in clear fluid 114 compacted on the surface of first dielectric passivation layer 106 in the narrower portion of display cell 110a and with colorant particles 244 compacted on the surface of second dielectric passivation layer 122 in the wider portion of display cell 110a, the first color optical state having the color of colorant particles 244 is achieved.

Display cell 110b is in a second color optical state having the color of positively charged colorant particles 242. The second color optical state is provided by applying a positive bias to first electrode 104a relative to the reference bias applied to second electrode 124. The positive bias applied to first electrode 104a attracts negatively charged colorant particles 244 and repels positively charged colorant particles 242. Colorant particles 244 are guided by second sidewalls 118 of display cell 110b into the narrower portion of display cells 110b and compacted on the surface of first dielectric passivation layer 106 adjacent to first electrode 104b.

The reference bias applied to second electrode 124 attracts colorant particles 242. Colorant particles 242 are compacted on the surface of second passivation layer 122 adjacent to second electrode 124. With colorant particles 244 in clear fluid 114 compacted on the surface of first dielectric passivation layer 106 in the narrower portion of display cell 110b and with colorant particles 242 compacted on the surface of second dielectric passivation layer 122 in the wider portion of display cell 110b, the second color optical state having the color of colorant particles 242 is achieved.

Display cell 110c is in a mixed color optical state having the color of the combination of the colors of colorant particles 242 and 244. The mixed color optical state is provided by applying no bias or pulses to first electrode 104c relative to the reference bias applied to second electrode 124. The no bias or pulses applied to first electrode 104c spreads colorant particles 242 and 244 throughout display cell 110c. With colorant particles 242 and 244 in clear fluid 114 spread throughout display cell 110c, the mixed color optical state having the color of the combination of the color of colorant particles 242 and 244 is achieved.

Figure 6:
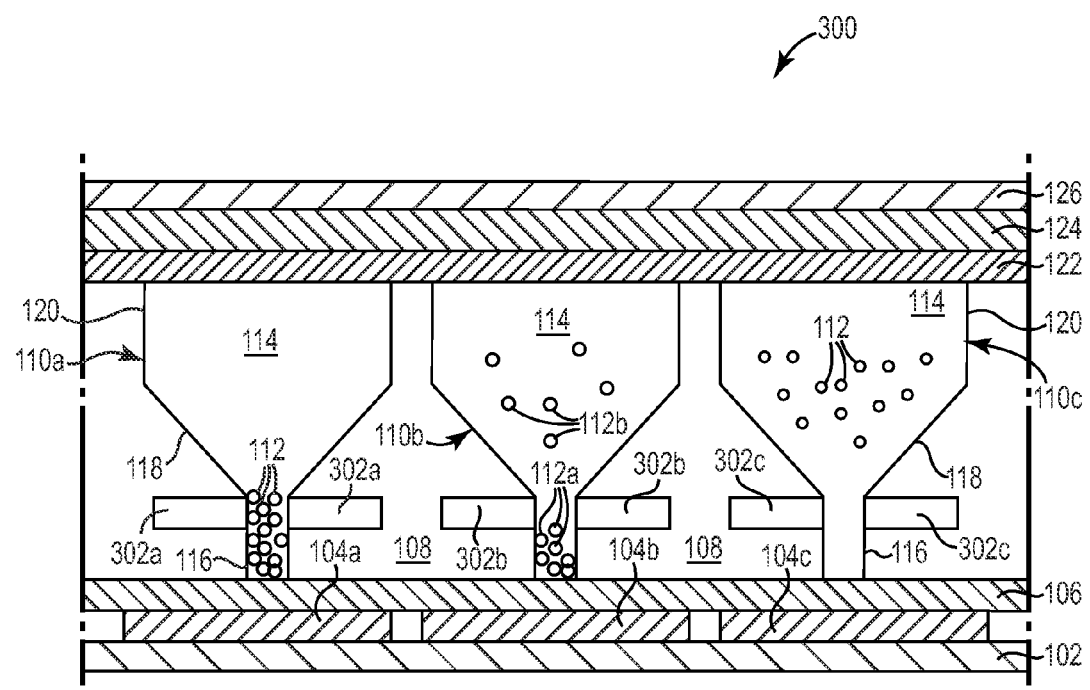
FIG. 6 illustrates a cross-sectional view of another embodiment of an electro-optical display.

FIG. 6 illustrates a cross-sectional view of another embodiment of an electro-optical display 300. Electro-optical display 300 is similar to electro-optical display 100a previously described and illustrated with reference to FIG. 1A, except that electro-optical display 300 includes third electrodes 302a-302c. Third electrodes 302a-302c are gate electrodes adjacent to the top of the narrower portions defined by first sidewalls 116 of display cells 110a-110c.

Gate electrodes 302a-302c are used to control the movement of colorant particles 112 into and out of the narrower portions of display cells 110a-110c. Gate electrodes 302a-302c are used to control an amount of the colorant particles 112 released from the narrower portions of display cells 110a-110c and moved into the wider portions defined by sidewalls 118 and 120 of display cells 110a-110c. By controlling the amount of colorant particles 112 released from the narrower portions of display cells 110a-110c and moved into the wider portions of display cells 110a-110c, gate electrodes 302a-302c also control the color perceived by a viewer of electro-optical display 300, including a variety of tones in the grayscale.

Each display cell 110a-110c illustrated in FIG. 6 is in a different optical state based on the bias conditions applied to first electrodes 104a-104c, second electrode 124, and third electrodes 302a-302c. Display cell 110a is in a clear optical state. The clear optical state is provided by applying a negative bias to first electrode 104a and no bias to gate electrode 302a relative to a reference bias applied to second electrode 124. The negative bias applied to first electrode 104a attracts positively charged colorant particles 112. Colorant particles 112 are guided by second sidewalls 118 of display cell 110a into the narrower portion of display cell 110a and compacted on the surface of first dielectric passivation layer 106 adjacent to first electrode 104a. With colorant particles 112 in clear fluid 114 compacted on the surface of first dielectric passivation layer 106 in the narrower portion of display cell 110a, the clear optical state is achieved.

Display cell 110b is in a grayscale optical state. The grayscale optical state is provided by applying a positive bias to first electrode 104b and a positive bias to gate electrode 302b relative to the reference bias applied to second electrode 124. The positive bias applied to first electrode 104b and to gate electrode 302b repels positively charged colorant particles 112. Based on the positive bias applied to first electrode 104b and on the positive bias applied to gate electrode 302b, the amount of colorant particles 112 released from the narrower portion of display cell 110b to the wider portion of display cell 110b can be controlled. As a result, some of colorant particles 112 remain in the narrower portion of display cell 110b as indicated by colorant particles 112a and some of colorant particles 112 pass into the wider portion of display cell 110b as indicated by colorant particles 112b. With colorant particles 112b in clear fluid 114 spread in the wider portion of display cell 110b, the grayscale optical state is achieved. The level of grayscale can be controlled by controlling the amount of colorant particles 112 released from the narrower portion of display cell 110b.

Display cell 110c is in spread optical state having the color of colorant particles 112. The spread optical state is provided by applying a positive bias to first electrode 104c and a zero bias to gate electrode 302c relative to the reference bias applied to second electrode 124. The positive bias applied to first electrode 104c and the zero bias applied to gate electrode 302c releases all colorant particles 112 from the narrower portion of display cell 110c into the wider portion of display cell 110c. Colorant particles 112 are spread throughout display cell 110c. With colorant particles 112 in clear fluid 114 spread throughout display cell 110c, the spread optical state having the color of colorant particles 112 is achieved.

Figure 7:
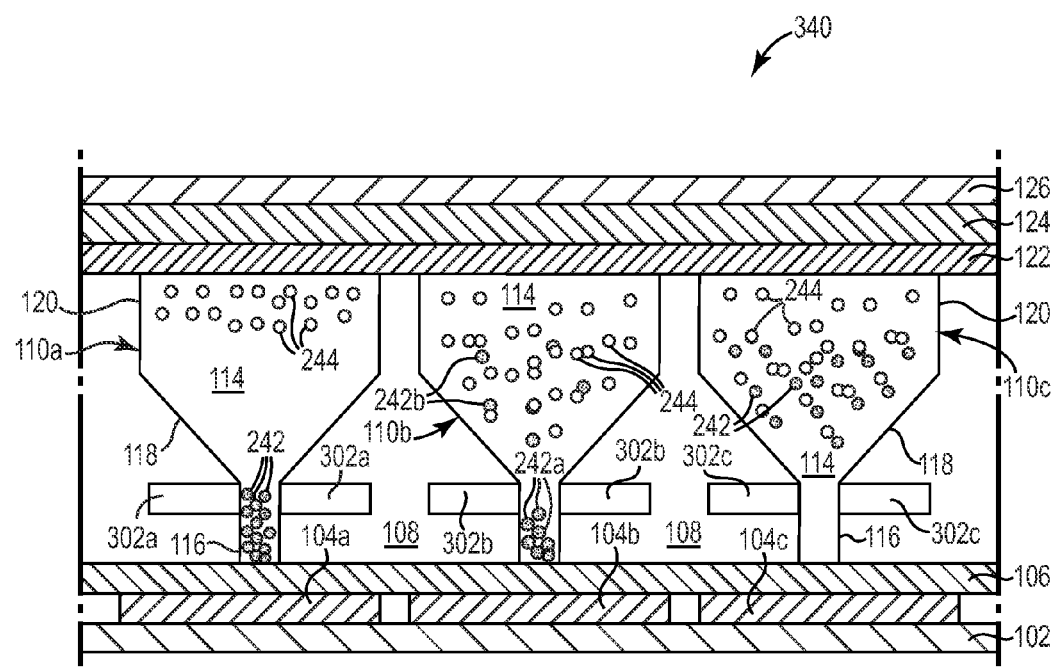
FIG. 7 illustrates a cross-sectional view of another embodiment of an electro-optical display.

FIG. 7 illustrates a cross-sectional view of another embodiment of an electro-optical display 340. Electro-optical display 340 is similar to electro-optical display 300 previously described and illustrated with reference to FIG. 6, except dual colorant particles 242 and 244 replace colorant particles 112. In the embodiment illustrated in FIG. 7, charged colorant particles 242 and 244 in dual colorant ink are oppositely charged and each provides a different color, such as cyan and magenta.

Each display cell 110a-110c illustrated in FIG. 7 is in a different optical state based on the bias conditions applied to first electrodes 104a-104c, second electrode 124, and third electrodes 302a-302c. Display cell 110a is in a first color optical state having the color of colorant particles 244. The first color optical state is provided by applying a negative bias to first electrode 104a and no bias to gate electrode 302a relative to a reference bias applied to second electrode 124. The negative bias applied to first electrode 104a attracts positively charged colorant particles 242 and repels negatively charged colorant particles 244. Colorant particles 242 are guided by second sidewalls 118 of display cell 110a into the narrower portion of display cell 110a and compacted on the surface of first dielectric passivation layer 106 adjacent to first electrode 104a.

The reference bias applied to second electrode 124 attracts colorant particles 244. Colorant particles 244 are compacted on the surface of second passivation layer 122 adjacent to second electrode 124. With colorant particles 242 in clear fluid 114 compacted on the surface of first dielectric passivation layer 106 in the narrower portion of display cell 110a and with colorant particles 244 compacted on the surface of second dielectric passivation layer 122 in the wider portion of display cell 110a, the first color optical state having the color of colorant particles 244 is achieved.

Display cell 110b is in a first mixed color optical state having the color of the combination of the colors of colorant particles 242 and 244. The first mixed color optical state is provided by applying a positive bias to first electrode 104b and a positive bias to gate electrode 302b relative to the reference bias applied to second electrode 124. The positive bias applied to first electrode 104b and to gate electrode 302b repel positively charged colorant particles 242. Based on the positive bias applied to first electrode 104b and on the positive bias applied to gate electrode 302b, the amount of colorant particles 242 released from the narrower portion of display cell 110b to the wider portion of display cell 110b can be controlled. As a result, some of colorant particles 242 remain in the narrower portion of display cell 110b as indicated by colorant particles 242a and some of colorant particles 242 pass to the wider portion of display cell 110b as indicated by colorant particles 242b.

The positive bias applied to first electrode 104b and to gate electrode 302b attracts negatively charged colorant particles 244 to spread colorant particles 244 throughout the wider portion of display cell 110b. With colorant particles 242b and 244 in clear fluid 114 spread in the wider portion of display cell 110b, the first mixed color optical state having a color based on the colors of colorant particles 242b and 244 is achieved. The color can be controlled by controlling the amount of colorant particles 242 released from the narrower portion of display cell 110b.

Display cell 110c is in a second mixed color optical state having the color of the combination of the colors of colorant particles 242 and 244. The second mixed color optical state is provided by applying a positive bias to first electrode 104c and a negative bias to gate electrode 302c relative to the reference bias applied to second electrode 124. The positive bias applied to first electrode 104c and the negative bias applied to gate electrode 302c releases all colorant particles 242 from the narrower portion of display cell 110c into the wider portion of display cell 110c. The positive bias applied to first electrode 104c attracts negatively charged colorant particles 244 to spread colorant particles 244 throughout the wider portion of display cell 110c. With colorant particles 242 and 244 in clear fluid 114 spread throughout the wider portion of display cell 110c, the second mixed color optical state having a color based on the colors of colorant particles 242 and 244 is achieved.

Figure 8:
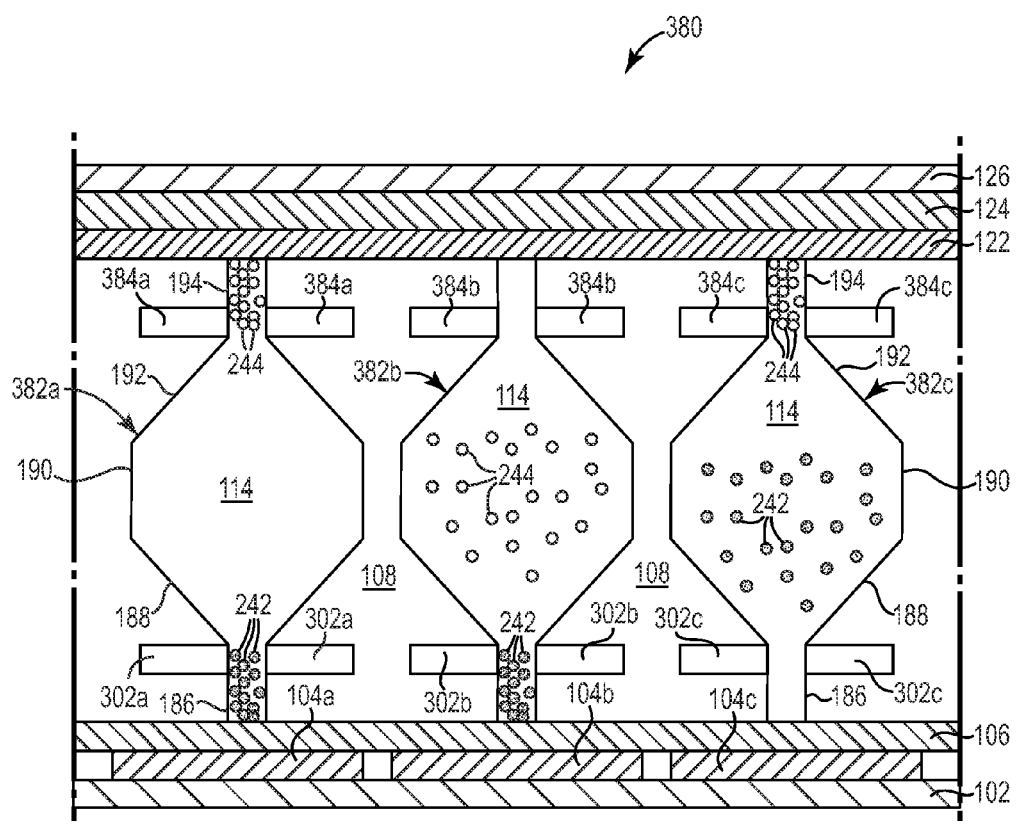
FIG. 8 illustrates a cross-sectional view of another embodiment of an electro-optical display.

FIG. 8 illustrates a cross-sectional view of another embodiment of an electro-optical display 380. Electro-optical display 380 is similar to electro-optical display 340 previously described and illustrated with reference to FIG. 7, except that in electro-optical display 380 display cells 382a-382c replace display cells 110a-110c and electro-optical display 380 includes fourth electrodes 384a-384c.

In the embodiment illustrated in FIG. 8, structured dielectric layer 108 defines each display cell 382a-382c to have mirror symmetrical first sidewalls 186, second sidewalls 188, third sidewalls 190, fourth sidewalls 192, and fifth sidewalls 194. First sidewalls 186 are adjacent to and perpendicular to first electrodes 104a-104c. Fifth sidewalls 194 are adjacent to and perpendicular to second electrode 124. Third sidewalls 190 are parallel to first sidewalls 186 and fifth sidewalls 194. Second sidewalls 188 are sloped and connect first sidewalls 186 to third sidewalls 190. Fourth sidewalls 192 are sloped and connect fifth sidewalls 194 to third sidewalls 190.

First sidewalls 186 define a first narrower recess or reservoir portion of each display cell 382a-382c for compacting colorant particles 242 adjacent to first electrodes 104a-104c. Second sidewalls 188 are sloped to guide colorant particles 242 into the first reservoir portion of each display cell 382a-382c. Third sidewalls 190 provide a wider portion of each display cell 382a-382c for spreading colorant particles 242 and 244. Fifth sidewalls 194 define a second narrower recess or reservoir portion of each display cell 382a-382c for compacting colorant particles 244 adjacent to second electrode 124. Fourth sidewalls 192 are sloped to guide colorant particles 244 into the second reservoir portion of each display cell 382a-382c.

The cross-sectional area of each display cell 382a-382c between third sidewalls 190 is greater than the cross-sectional area of each display cell 382a-382c between first sidewalls 186 and fifth sidewalls 194. The cross-sectional area of each display cell 382a-382c between second sidewalls 188 is reduced from the cross-sectional area of each display cell 382a-382c between third sidewalls 190 to the cross-sectional area of each display cell 382a-382c between first sidewalls 186. The cross-sectional area of each display cell 382a-382c between fourth sidewalls 192 is reduced from the cross-sectional area of each display cell 382a-382c between third sidewalls 190 to the cross-sectional area of each display cell 382a-382c between fifth sidewalls 194.

Gate electrodes 302a-302c are used to control the movement of colorant particles 242 into and out of the first narrower portions of display cells 382a-382c. Gate electrodes 302a-302c are used to control an amount of the colorant particles 242 released from the first narrower portions of display cells 382a-382c and moved into the wider portions defined by second sidewalls 188, third sidewalls 190, and fourth sidewalls 192 of display cells 382a-382c. By controlling the amount of colorant particles 242 released from the first narrower portions of display cells 382a-382c and moved into the wider portions of display cells 382a-382c, gate electrodes 302a-302c also control the color perceived by a viewer of electro-optical display 380, including a variety of tones in the grayscale.

Fourth electrodes 384a-384c are gate electrodes adjacent to the bottom of the narrower portions defined by fifth sidewalls 194 of display cells 384a-384c. Gate electrodes 384a-384c are used to control the movement of colorant particles 244 into and out of the second narrower portions of display cells 382a-382c. Gate electrodes 384a-384c are used to control an amount of the colorant particles 244 released from the second narrower portions of display cells 382a-382c and moved into the wider portions defined by second sidewalls 188, third sidewalls 190, and fourth sidewalls 192 of display cells 382a-382c. By controlling the amount of colorant particles 244 released from the second narrower portions of display cells 382a-382c and moved into the wider portions of display cells 382a-382c, gate electrodes 384a-384c also control the color perceived by a viewer of electro-optical display 380, including a variety of tones in the grayscale.

Each display cell 382a-382c illustrated in FIG. 8 is in a different optical state based on the bias conditions applied to first electrodes 104a-104c, second electrode 124, third electrodes 302a-302c, and fourth electrodes 384a-384c. Display cell 382a is in a clear optical state. The clear optical state is provided by applying a negative bias to first electrode 104a and no bias to gate electrodes 302a and 384a relative to a reference bias applied to second electrode 124. The negative bias applied to first electrode 104a attracts positively charged colorant particles 242 and repels negatively charged colorant particles 244. Colorant particles 242 are guided by second sidewalls 188 of display cell 382a into the first narrower portion of display cell 382a and compacted on the surface of first dielectric passivation layer 106 adjacent to first electrode 104a.

The reference bias applied to second electrode 124 attracts colorant particles 244. Colorant particles 244 are guided by fourth sidewalls 192 of display cell 382a into the second narrower portion of display cell 382a and compacted on the surface of second passivation layer 122 adjacent to second electrode 124. With colorant particles 242 in clear fluid 114 compacted on the surface of first dielectric passivation layer 106 in the first narrower portion of display cell 382a and with colorant particles 244 compacted on the surface of second dielectric passivation layer 122 in the second narrower portion of display cell 382a, the clear optical state is achieved.

Display cell 382b is in a first color optical state having the color of colorant particles 244. The first color optical state is provided by applying a negative bias to first electrode 104a and a zero bias to gate electrodes 302b and 384b relative to the reference bias applied to second electrode 124. The negative bias applied to first electrode 104a attracts positively charged colorant particles 242. Colorant particles 242 are guided by second sidewalls 188 of display cell 382a into the first narrower portion of display cell 382a and compacted on the surface of first dielectric passivation layer 106 adjacent to first electrode 104b.

Colorant particles 244 are released from the second narrower portion of display cell 382b and are spread throughout the wider portion of display cell 382b. With colorant particles 242 in clear fluid 114 compacted on the surface of first dielectric passivation layer 106 in the narrower portion of display cell 110a and with colorant particles 244 spread throughout the wider portion of display cell 382b, the first color optical state having the color of colorant particles 244 is achieved.

Display cell 382c is in a second color optical state having the color of colorant particles 242. The second color optical state is provided by applying a negative bias to first electrode 104c and a negative bias to gate electrodes 302c and 384c relative to the reference bias applied to second electrode 124. The positive bias applied to second electrode 124 attracts negatively charged colorant particles 244. Colorant particles 244 are guided by fourth sidewalls 192 of display cell 382c into the second narrower portion of display cell 382c and compacted on the surface of second dielectric passivation layer 122 adjacent to second electrode 124.

Colorant particles 242 are released from first narrower portion of display cell 382c and are spread throughout the wider portion of display cell 382c. With colorant particles 242 spread throughout the wider portion of display cell 382c and with colorant particles 244 compacted on the surface of second dielectric passivation layer 122 in the second narrower portion of display cell 382c, the second color optical state having the color of colorant particles 242 is achieved.

Additional optical states for electro-optical display 380 are also possible, such as a mixed color optical state where a controlled amount of colorant particles 242 are released from the first narrower portion of the display cell and/or a controlled amount of colorant particles 244 are released from the second narrower portion of the display cell. In this mixed color optical state, some colorant particles 242 remain in the first narrower portion of the display cell and/or some colorant particles 244 remain in the second narrower portion of the display cell. The color of the mixed optical state can be controlled by varying the amount of colorant particles 242 released from the first narrower portion and/or the amount of colorant particles 244 released from the second narrower portion of the display cell.

Figure 9A:
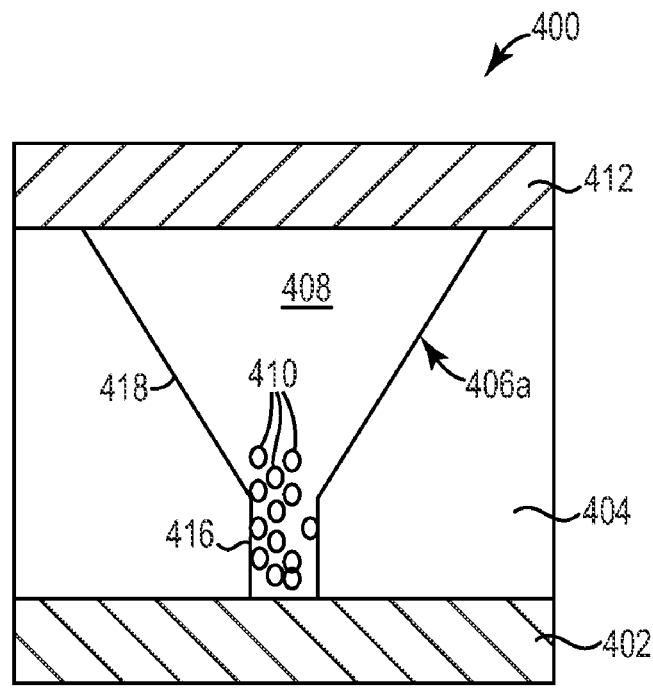
FIG. 9A illustrates a cross-sectional view of one embodiment of an electro-optical display element.

FIG. 9A illustrates a cross-sectional view of one embodiment of an electro-optical display element 400. Electro-optical display element 400 is triangular-shaped with a separate reservoir portion. Electro-optical display element 400 includes a first electrode 402, a second electrode 412, a dielectric material 404, and a display cell 406a. First electrode 402 is formed on a first substrate (not shown), and second electrode 412 is formed on a second substrate (not shown). In other embodiments, a first dielectric passivation layer (not shown) is provided between first electrode 402 and display cell 406a, and a second dielectric passivation layer (not shown) is provided between second electrode 412 and display cell 406a. In one embodiment, display cell 406a is used for display cells 110a-110c previously described and illustrated with reference to FIGS. 1A-7.

Display cell 406a is defined by dielectric material 404, which extends between first electrode 402 and second electrode 412. Display cell 406a is filled with a carrier fluid 408 with colorant particles 410. In one embodiment, dielectric material 404 includes dielectric material 108, 142, or 182, carrier fluid 408 includes carrier fluid 114 or 184, and colorant particles 410 include single colorant particles 112 or dual colorant particles 242 and 244 as previously described and illustrated with reference to FIGS. 1A-7.

Display cell 406a includes mirror symmetrical first sidewalls 416 and second sidewalls 418. First sidewalls 416 are adjacent to and perpendicular to first electrode 402. Second sidewalls 418 are sloped and connect second electrode 412 to first sidewalls 416. Second sidewalls 418 are oblique with respect to first electrode 402 and second electrode 412. The cross-sectional area of display cell 406a between second sidewalls 418 is greatest at the interface with second electrode 412 and is gradually reduced to the cross-sectional area of display cell 406a between first sidewalls 416. First sidewalls 416 define a narrower recess or reservoir portion of display cell 406a for compacting colorant particles 410 adjacent to first electrode 402. Second sidewalls 418 define a wider portion of display cell 406a near second electrode 412 for spreading colorant particles 410. Second sidewalls 418 are sloped to guide colorant particles 410 into the reservoir portion of display cell 406a in response to a suitable bias being applied to first electrode 402 relative to second electrode 412.

Figure 9B:
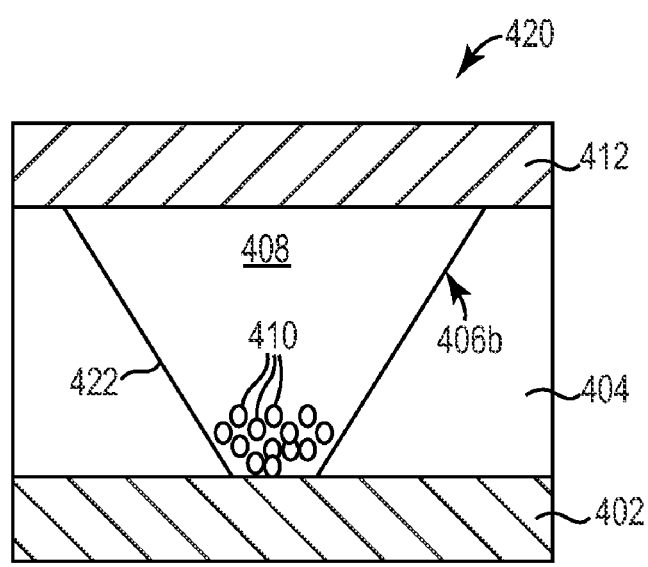
FIG. 9B illustrates a cross-sectional view of another embodiment of an electro-optical display element.

FIG. 9B illustrates a cross-sectional view of another embodiment of an electro-optical display element 420. Electro-optical display element 420 is triangular-shaped and does not include a separate reservoir portion. Electro-optical display element 420 is similar to electro-optical display element 400 previously described and illustrated with reference to FIG. 9A, except that in electro-optical display element 420 display cell 406b replaces display cell 406a. In one embodiment, display cell 406b is used for display cells 110a-110c previously described and illustrated with reference to FIGS. 1A-7.

Display cell 406b is defined by dielectric material 404 and includes mirror symmetrical sidewalls 422. Sidewalls 422 are oblique with respect to first electrode 402 and second electrode 412. The cross-sectional area of display cell 406b between sidewalls 422 is greatest at the interface with second electrode 412 and least at the interface with first electrode 402. Sidewalls 422 are sloped to define a wider portion of display cell 406b near second electrode 412 for spreading colorant particles 410 and a narrower portion of display cell 406b near first electrode 402 for compacting colorant particles 410. Sloped sidewalls 422 of display cell 406b guide colorant particles 410 to the narrower portion of display cell 406a in response to a suitable bias being applied to first electrode 402 relative to second electrode 412.

Figure 9C:
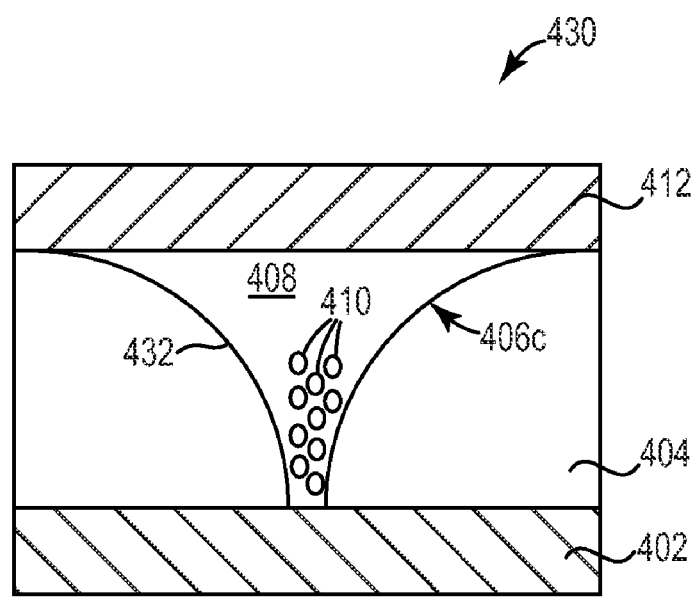
FIG. 9C illustrates a cross-sectional view of another embodiment of an electro-optical display element.

FIG. 9C illustrates a cross-sectional view of another embodiment of an electro-optical display element 430. Electro-optical display element 430 is funnel-shaped and does not include a separate reservoir portion. Electro-optical display element 430 is similar to electro-optical display element 400 previously described and illustrated with reference to FIG. 9A, except that in electro-optical display element 430 display cell 406c replaces display cell 406a. In one embodiment, display cell 406c is used for display cells 110a-110c previously described and illustrated with reference to FIGS. 1A-7.

Display cell 406c is defined by dielectric material 404 and includes mirror symmetrical sidewalls 432. Sidewalls 432 are curved between first electrode 402 and second electrode 412. The cross-sectional area of display cell 406c between sidewalls 432 greatest at the interface with second electrode 412 and least at the interface with first electrode 402. Sidewalls 432 are rounded to define a wider portion of display cell 406c near second electrode 412 for spreading colorant particles 410 and a narrower portion of display cell 406c near first electrode 402 for compacting colorant particles 410. Rounded sidewalls 432 of display cell 406c guide colorant particles 410 to the narrower portion of display cell 406c in response to a suitable bias being applied to first electrode 402 relative to second electrode 412.

Figure 9D:
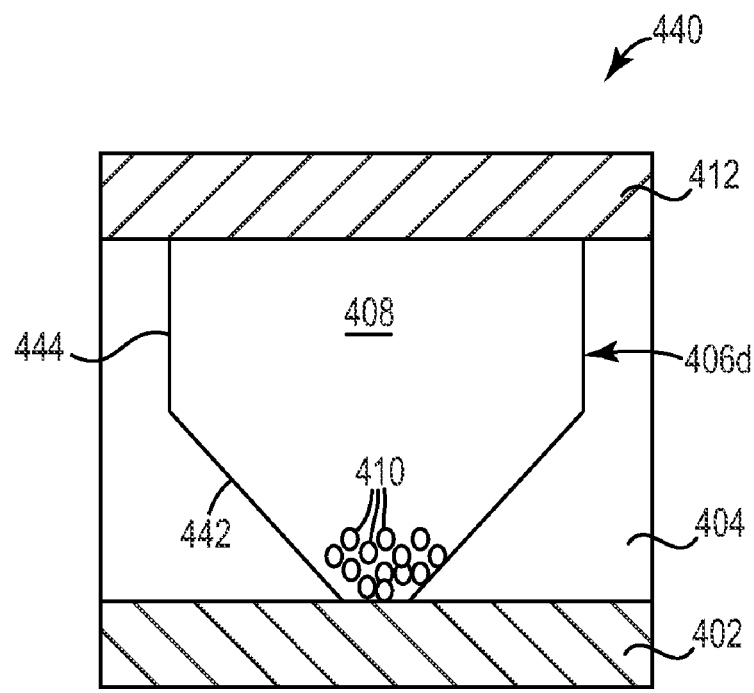
FIG. 9D illustrates a cross-sectional view of another embodiment of an electro-optical display element.

FIG. 9D illustrates a cross-sectional view of another embodiment of an electro-optical display element 440. Electro-optical display element 440 is shaped like a pencil tip and does not include a separate reservoir portion. In another embodiment, electro-optical display element 440 includes a separate reservoir portion. Electro-optical display element 440 is similar to electro-optical display element 400 previously described and illustrated with reference to FIG. 9A, except that in electro-optical display element 440 display cell 406d replaces display cell 406a. In one embodiment, display cell 406d is used for display cells 110a-110c previously described and illustrated with reference to FIGS. 1A-7.

Display cell 406d is defined by dielectric material 404 and includes mirror symmetrical first sidewalls 442 and second sidewalls 444. First sidewalls 442 are oblique with respect to first electrode 402. Second sidewalls 444 are adjacent to and perpendicular to second electrode 412. The cross-sectional area of display cell 406b between first sidewalls 442 is greatest at the interface with second sidewalls 444 and least at the interface with first electrode 402. Second sidewalls 444 define a wider portion of display cell 406b adjacent second electrode 412 for spreading colorant particles 410. First sidewalls 442 are sloped to define a narrower portion of display cell 406d near first electrode 402 for compacting colorant particles 410. Sloped first sidewalls 442 of display cell 406d guide colorant particles 410 to the narrower portion of display cell 406d in response to a suitable bias being applied to first electrode 402 relative to second electrode 412.

Figure 9E:
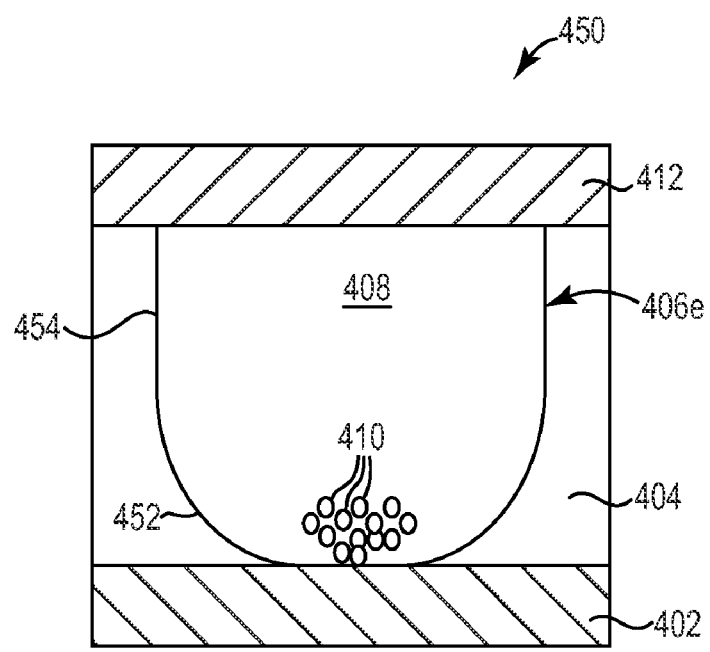
FIG. 9E illustrates a cross-sectional view of another embodiment of an electro-optical display element.

FIG. 9E illustrates a cross-sectional view of another embodiment of an electro-optical display element 450. Electro-optical display element 450 is U-shaped and does not include a separate reservoir portion. Electro-optical display element 450 is similar to electro-optical display element 400 previously described and illustrated with reference to FIG. 9A, except that in electro-optical display element 450 display cell 406e replaces display cell 406a. In one embodiment, display cell 406e is used for display cells 110a-110c previously described and illustrated with reference to FIGS. 1A-7.

Display cell 406e is defined by dielectric material 404 and includes mirror symmetrical first sidewalls 452 and second sidewalls 454. First sidewalls 452 are curved between first electrode 402 and second sidewalls 454. Second sidewalls 454 are adjacent to and perpendicular to second electrode 412. The cross-sectional area of display cell 406e between first sidewalls 452 is greatest at the interface with second sidewalls 454 and least at the interface with first electrode 402. Second sidewalls 454 define a wider portion of display cell 406e adjacent second electrode 412 for spreading colorant particles 410. First sidewalls 452 are curved to define a narrower portion of display cell 406e near first electrode 402 for compacting colorant particles 410. Curved first sidewalls 452 of display cell 406e guide colorant particles 410 to the narrower portion of display cell 406e in response to a suitable bias being applied to first electrode 402 relative to second electrode 412.

Figure 9F:
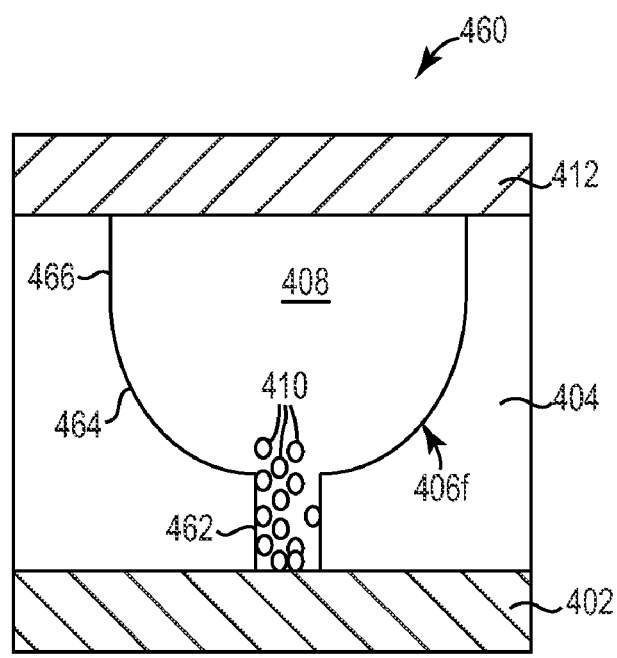
FIG. 9F illustrates a cross-sectional view of another embodiment of an electro-optical display element.

FIG. 9F illustrates a cross-sectional view of another embodiment of an electro-optical display element 460. Electro-optical display element 460 is U-shaped and includes a separate reservoir portion. Electro-optical display element 460 is similar to electro-optical display element 400 previously described and illustrated with reference to FIG. 9A, except that in electro-optical display element 460 display cell 406f replaces display cell 406a. In one embodiment, display cell 406f is used for display cells 110a-110c previously described and illustrated with reference to FIGS. 1A-7.

Display cell 406f is defined by dielectric material 404 and includes mirror symmetrical first sidewalls 462, second sidewalls 464, and third sidewalls 466. First sidewalls 462 are adjacent to and perpendicular to first electrode 402. Second sidewalls 464 are curved and connect first sidewalls 462 to third sidewalls 466. Third sidewalls 466 are adjacent to and perpendicular to second electrode 412. The cross-sectional area of display cell 406f between second sidewalls 464 is greatest at the interface with third sidewalls 466 and least at the interface with first sidewalls 462.

First sidewalls 462 define a narrower recess or reservoir portion of display cell 406f for compacting colorant particles 410 adjacent to first electrode 402. Third sidewalls 466 define a wider portion of display cell 406f adjacent to second electrode 412 for spreading colorant particles 410. Second sidewalls 464 are curved to guide colorant particles 410 into the reservoir portion of display cell 406f in response to a suitable bias being applied to first electrode 402 relative to second electrode 412.

Figure 9G:
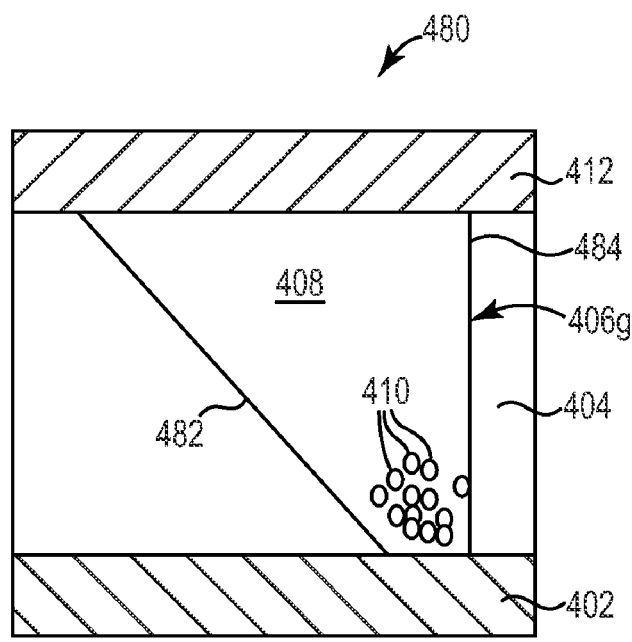
FIG. 9G illustrates a cross-sectional view of another embodiment of an electro-optical display element.

FIG. 9G illustrates a cross-sectional view of another embodiment of an electro-optical display element 480. Electro-optical display element 480 is right triangle shaped and does not include a separate reservoir portion. Electro-optical display element 480 is similar to electro-optical display element 400 previously described and illustrated with reference to FIG. 9A, except that in electro-optical display element 480 display cell 406g replaces display cell 406a. In one embodiment, display cell 406g is used for display cells 110a-110c previously described and illustrated with reference to FIGS. 1A-7.

Display cell 406g is defined by dielectric material 404 and includes a first sidewall 482 and a second sidewall 484. First sidewall 482 is oblique with respect to first electrode 402 and second electrode 412. Second sidewall 484 is perpendicular to first electrode 402 and second electrode 412. The cross-sectional area of display cell 406g between first sidewall 482 and second sidewall 484 is greatest at the interface with second electrode 412 and least at the interface with first electrode 402. First sidewall 482 is sloped to define a wider portion of display cell 406g near second electrode 412 for spreading colorant particles 410 and a narrower portion of display cell 406g near first electrode 402 for compacting colorant particles 410. Sloped first sidewall 482 of display cell 406g guides colorant particles 410 to the narrower portion of display cell 406g in response to a suitable bias being applied to first electrode 402 relative to second electrode 412.

Figure 9H:
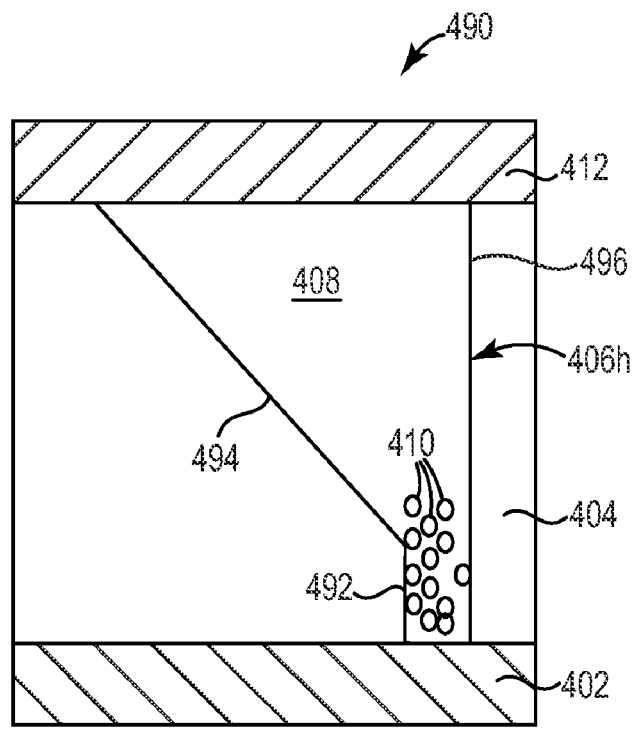
FIG. 9H illustrates a cross-sectional view of another embodiment of an electro-optical display element.

FIG. 9H illustrates a cross-sectional view of another embodiment of an electro-optical display element 490. Electro-optical display element 490 is right triangle shaped and includes a separate reservoir portion. Electro-optical display element 490 is similar to electro-optical display element 400 previously described and illustrated with reference to FIG. 9A, except that in electro-optical display element 490 display cell 406h replaces display cell 406a. In one embodiment, display cell 406h is used for display cells 110a-110c previously described and illustrated with reference to FIGS. 1A-7.

Display cell 406h is defined by dielectric material 404 and includes a first sidewall 492, a second sidewall 494, and a third sidewall 496. First sidewall 492 is adjacent to and perpendicular to first electrode 402. Second sidewall 494 is oblique with respect to first electrode 402 and second electrode 412. Third sidewall 496 is perpendicular to first electrode 402 and second electrode 412. The cross-sectional area of display cell 406h between second sidewall 494 and third sidewall 496 is greatest at the interface with second electrode 412 and least at the interface with first sidewall 492.

First sidewall 492 and the lower portion of third sidewall 496 define a narrower recess or reservoir portion of display cell 406h for compacting colorant particles 410 adjacent to first electrode 402. Second sidewall 494 is sloped to define a wider portion of display cell 406h near second electrode 412 for spreading colorant particles 410. Sloped second sidewall 494 of display cell 406h guides colorant particles 410 into the reservoir portion of display cell 406h in response to a suitable bias being applied to first electrode 402 relative to second electrode 412.

In other embodiments, structurally controlled electrophoretic display cells can contain one or more of the structures previously described and illustrated with reference to FIGS. 9A-9H. In other embodiments, other suitable structures are used for the display cells, such as one dimensional shapes (e.g., prisms), two dimensional shapes (e.g., pyramidal arrays or cone arrays). Other suitable shapes include triangular, pyramidal, cone, etc. combined with vertical containment walls or sloped containment walls.

Figure 10A:
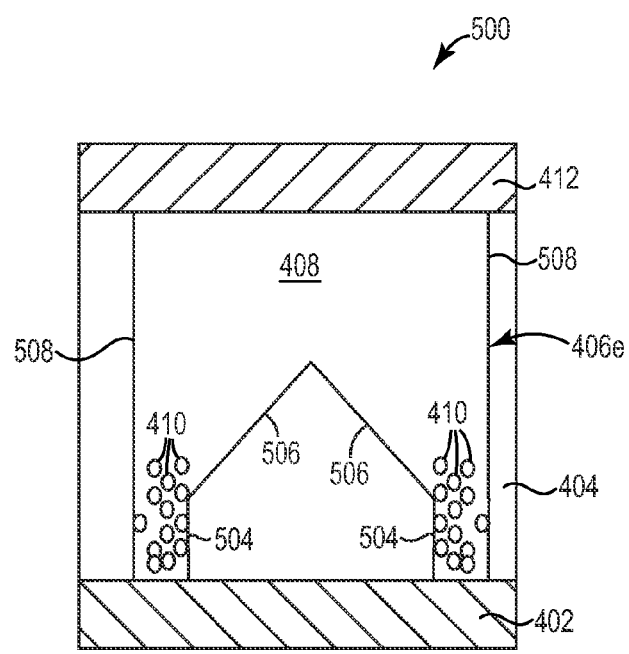
FIG. 10A illustrates a cross-sectional view of another embodiment of an electro-optical display element.

FIG. 10A illustrates a cross-sectional view of another embodiment of an electro-optical display element 500. Electro-optical display element 500 is arch-shaped and includes two separate reservoir portions. Electro-optical display element 500 is similar to electro-optical display element 400 previously described and illustrated with reference to FIG. 9A, except that in electro-optical display element 500 display cell 502a replaces display cell 406a. In one embodiment, display cell 500 is used for display cells 110a-110c previously described and illustrated with reference to FIGS. 1A-7.

Display cell 502a is defined by dielectric material 404 and includes first sidewalls 504, second sidewalls 506, and third sidewall 508. First sidewalls 504 are adjacent to and perpendicular to first electrode 402. Second sidewalls 506 are oblique with respect to first electrode 402 and second electrode 412 and are connected to first sidewalls 504 at one end and to each other at the other end. Third sidewalls 508 are perpendicular to first electrode 402 and second electrode 412. The cross-sectional area of display cell 502a between third sidewalls 508 is greatest at the interface with second electrode 412. The cross-sectional area of display cell 502a between second sidewalls 506 and third sidewalls 508 is greatest at the interface of second sidewalls 506 with each other and least at the interface with first sidewalls 504.

First sidewalls 504 and the lower portions of third sidewalls 508 define two narrower recess or reservoir portions within display cell 502a for compacting colorant particles 410. Third sidewalls 508 define a wider portion of display cell 502a near second electrode 412 for spreading colorant particles 410. Sloped second sidewalls 506 of display cell 502a guide colorant particles 410 into the two reservoir portions of display cell 502a in response to a suitable bias being applied to first electrode 402 relative to second electrode 412.

Figure 10B:
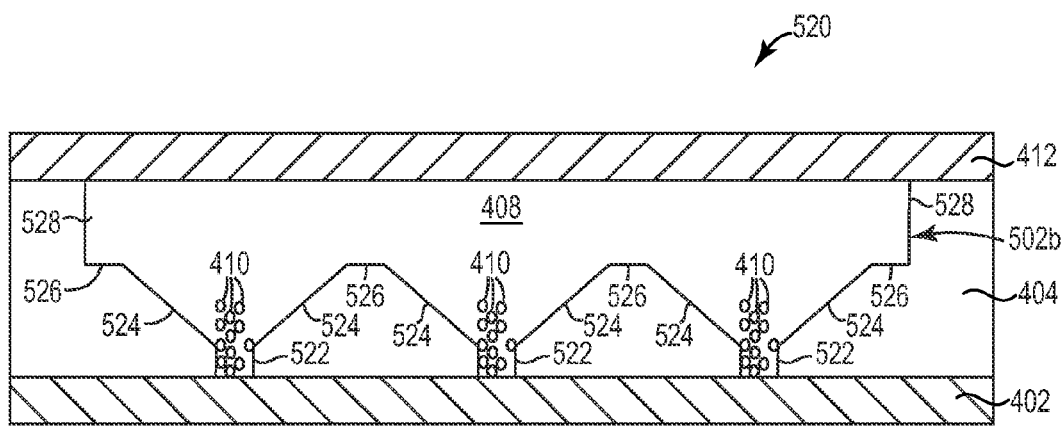
FIG. 10B illustrates a cross-sectional view of another embodiment of an electro-optical display element.

FIG. 10B illustrates a cross-sectional view of another embodiment of an electro-optical display element 520. Electro-optical display element 520 is multi-arch-shaped and includes more than two separate reservoir portions. Electro-optical display element 520 is similar to electro-optical display element 400 previously described and illustrated with reference to FIG. 9A, except that in electro-optical display element 520 display cell 502b replaces display cell 406a. In one embodiment, display cell 502b is used for display cells 110a-110c previously described and illustrated with reference to FIGS. 1A-7.

Display cell 502b is defined by dielectric material 404 and includes first sidewalls 522, second sidewalls 524, third sidewalls 526, and fourth sidewalls 528. First sidewalls 522 are adjacent to and perpendicular to first electrode 402. Second sidewalls 524 are oblique with respect to first electrode 402 and second electrode 412 and are connected to first sidewalls 522 at one end and to third sidewalls 526 at the other end. Third sidewalls 526 are parallel to first electrode 402 and second electrode 412 and connect second sidewalls 524 to each other in the center portion of display cell 502b and to fourth sidewalls 528 at each end portion of display cell 502b. Fourth sidewalls 528 are adjacent to and perpendicular to second electrode 412.

The cross-sectional area of display cell 502b between fourth sidewalls 528 is greatest at the interface with second electrode 412. The cross-sectional area of display cell 502b between second sidewalls 524 is greatest at the interface of second sidewalls 524 with third sidewalls 526 and least at the interface with first sidewalls 522. First sidewalls 522 define several narrower recess or reservoir portions within display cell 502b for compacting colorant particles 410. Fourth sidewalls 528 define a wider portion of display cell 502b near second electrode 412 for spreading colorant particles 410. Sloped second sidewalls 524 of display cell 502b guide colorant particles 410 into the several reservoir portions of display cell 502b in response to a suitable bias being applied to first electrode 402 relative to second electrode 412. In other embodiments, sloped second sidewalls 524 have another suitable shape, such as a shape previously described and illustrated with reference to FIGS. 9A-10A.

While three reservoir portions are illustrated in display cell 502b in FIG. 10B, in other embodiments any suitable number of reservoir portions can be used. By using multiple narrowing structures and reservoir portions within a single display cell, the clear aperture of the electro-optical display is improved due the reduced number of containment walls between display cells.

Figure 11A:
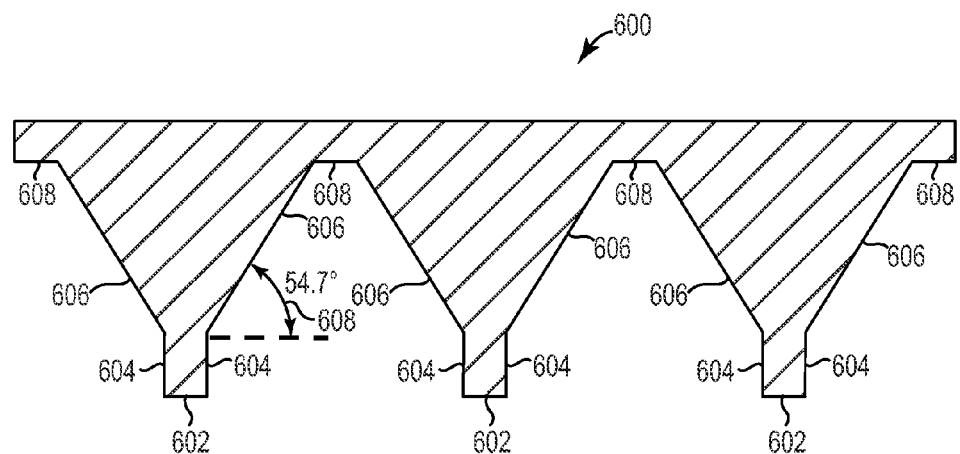
FIG. 11A illustrates a cross-sectional view of one embodiment of mold for fabricating an electro-optical display.
Figure 11B:
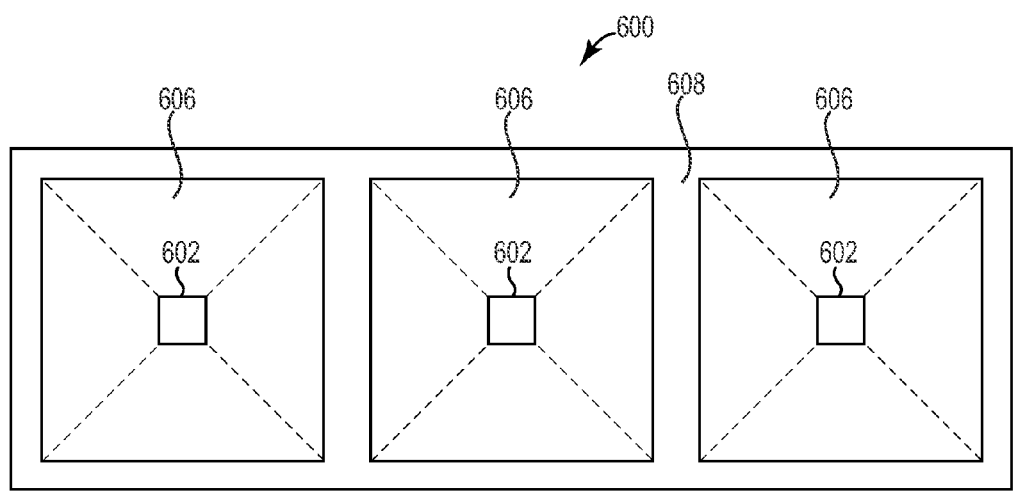
FIG. 11B illustrates a top view of the embodiment of the mold illustrated in FIG. 11A.

FIG. 11A illustrates a cross-sectional view and FIG. 11B illustrates a top view of one embodiment of a mold 600 for fabricating an electro-optical display. Mold 600 is inverse pyramidal in shape. In one embodiment, mold 600 is fabricated on silicon. Mold 600 can be used to emboss a dielectric material to provide a structured dielectric layer defining display cells.

Mold 600 includes first sidewalls 602, second sidewalls 604, third sidewalls 606, and fourth sidewalls 608. First sidewalls 602 are used for defining the bottom of display cells. Second sidewalls 604 are perpendicular to first sidewalls 604 and are for defining square-shaped narrower recess or reservoir portions of a display cell. Third sidewalls 606 are sloped and connect second sidewalls 604 to fourth sidewalls 608. In one embodiment, the angle of third sidewalls 606 is 54.7° with respect to first sidewalls 602. Third sidewalls 606 are for defining sloped sidewall portions of display cells for guiding colorant particles into the reservoir portions of the display cells. Fourth sidewalls 608 are for defining the top of display cells.

Figure 12:
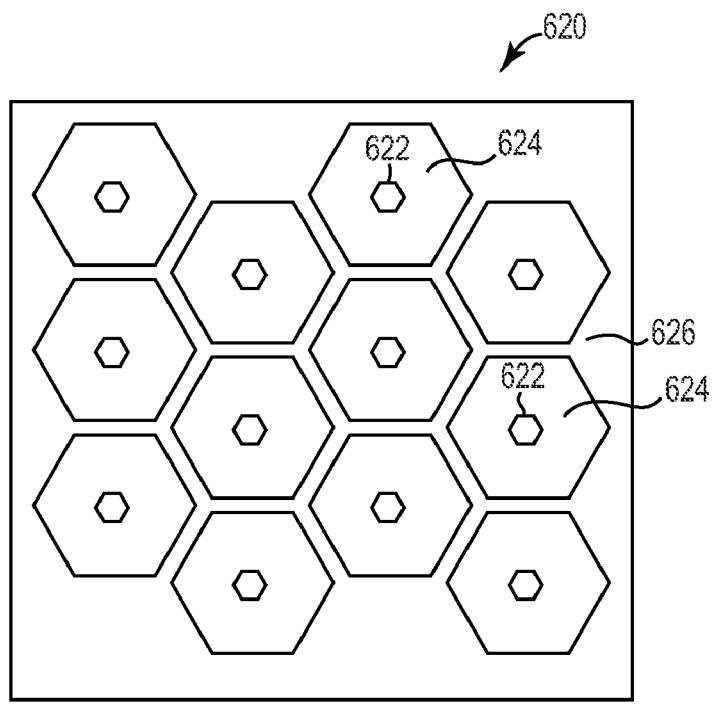
FIG. 12 illustrates a top view of another embodiment of a mold for fabricating an electro-optical display.

FIG. 12 illustrates a top view of another embodiment of a mold 620 for fabricating an electro-optical display. Mold 620 has a hexagonal grid structure. In one embodiment, mold 620 is fabricated on silicon. Mold 620 can be used to emboss a dielectric material to provide a structured dielectric layer defining display cells.

Mold 620 includes first sidewalls 622, second sidewalls (not shown), third sidewalls 624, and fourth sidewalls 626. First sidewalls 622 are used for defining the bottom of display cells. The second sidewalls are perpendicular to first sidewalls 622 and are for defining hexagon-shaped narrower recess or reservoir portions of a display cell. Third sidewalls 624 are sloped and connect the second sidewalls to fourth sidewalls 626. Third sidewalls 624 are for defining sloped sidewall portions of display cells for guiding colorant particles into the reservoir portions of the display cells. Fourth sidewalls 626 are for defining the top of display cells.

Figure 13:
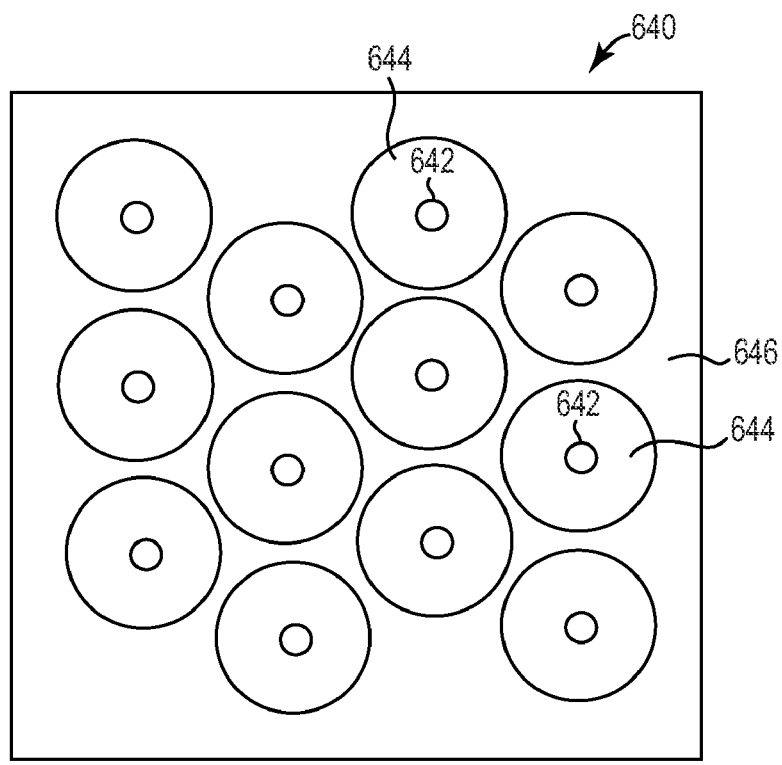
FIG. 13 illustrates a top view of another embodiment of a mold for fabricating an electro-optical display.

FIG. 13 illustrates a top view of another embodiment of a mold 640 for fabricating an electro-optical display. Mold 640 has a circular grid structure. In one embodiment, mold 640 is fabricated on silicon, glass, or other suitable substrate. Mold 640 can be used to emboss a dielectric material to provide a structured dielectric layer defining display cells.

Mold 640 includes first sidewalls 642, second sidewalls (not shown), third sidewalls 644, and fourth sidewalls 646. First sidewalls 642 are used for defining the bottom of display cells. The second sidewalls are perpendicular to first sidewalls 642 and are for defining circle-shaped narrower recess or reservoir portions of a display cell. Third sidewalls 644 are sloped and connect the second sidewalls to fourth sidewalls 646. Third sidewalls 644 are for defining sloped sidewall portions of display cells for guiding colorant particles into the reservoir portions of the display cells. Fourth sidewalls 646 are for defining the top of display cells.

Embodiments provide an electrophoretic architecture with a display cell having a geometrical structure with a narrowing portion and sloped walls that induces forces tangential to the slope from electrophoretic interaction. This force allows the compaction of charged colorant particles in electronic ink and thus provides various optical states in combination with a clear or colored ink medium or colored bottom layer (e.g., white reflector or dyed materials). This enables bi-state (i.e., colored to clear or colored to white state) or tri-state (i.e., colored to white to another color). Structurally controlled electrophoresis with charged white particles in colored fluid provides spot color capability as the color can be controlled by varying the colorants in the ink medium.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display element comprising:
a first electrode;
a second electrode;
a display cell defined by a dielectric material between the first electrode and the second electrode, the display cell comprising a narrower portion adjacent the first electrode and a wider portion, the narrower portion having a first cross-sectional area and the wider portion having a second cross-sectional area, a cross-sectional area of the display cell gradually transitioning between the first cross-sectional area and the second cross-sectional area; and
a fluid with colorants within the display cell,
wherein the narrower portion of the display cell comprises a sidewall substantially perpendicular to the first electrode, and
wherein the wider portion of the display cell comprises a sidewall substantially perpendicular to the second electrode.

2. The display element of claim 1, wherein the dielectric material defines a sloped sidewall of the display cell between the wider portion and the narrower portion.

3. The display element of claim 1, further comprising:
a first substrate contacting the first electrode;
a second substrate contacting the second electrode;
a gate electrode between the narrower portion and the wider portion,
wherein the first electrode, the second electrode, and the gate electrode are each configured to be individually biased, and
wherein the first electrode is arranged opposite the second electrode.

4. The display element of claim 1, wherein the colorants comprises colorant particles of two different colors, the different colored colorant particles having opposite polarities.

5. A display element, comprising:
a first electrode;
a second electrode;
a display cell defined by a dielectric material between the first electrode and the second electrode, the display cell comprising a narrower portion adjacent the first electrode and a wider portion, the narrower portion having a first cross-sectional area and the wider portion having a second cross-sectional area, a cross-sectional area of the display cell gradually transitioning between the first cross-sectional area and the second cross-sectional area; and
a fluid with colorants within the display cell,
wherein the display cell comprises a further narrower portion having a third cross-sectional area adjacent the second electrode, a cross-sectional area of the display cell gradually transitioning between the third cross-sectional area and the second cross-sectional area.

6. The display element of claim 5, further comprising:
a first gate electrode between the narrower portion and the wider portion; and
a second gate electrode between the further narrower portion and the wider portion,
wherein the first electrode, the second electrode, the first gate electrode, and the second gate electrode are each configured to be individually biased.

7. The display element of claim 5, wherein the colorants comprise colorant particles of two different colors, the different colored colorant particles having opposite polarities.

8. A display element comprising:
a first substrate;
a first electrode supported by the first substrate;
a second substrate parallel to the first substrate;

a second electrode supported by the second substrate, the second electrode opposite the first electrode;

a display cell defined by a dielectric material between the first electrode and the second electrode, the dielectric material defining a first sidewall and a second sidewall of the display cell that are oblique with respect to the first substrate, the first sidewall being mirror symmetrical to the second sidewall; and a fluid with colorant particles within the display cell, wherein the dielectric material defines a first reservoir of the display cell adjacent to the first electrode, a sidewall of the first reservoir intersecting the first sidewall, the sidewall of the first reservoir being substantially perpendicular to the first substrate, and wherein the dielectric material defines a second reservoir of the display cell adjacent to the first electrode and coplanar with the first reservoir, a sidewall of the second reservoir intersecting the second sidewall, the sidewall of the second reservoir being substantially perpendicular to the first substrate.

9. The display element of claim 8, wherein the first electrode comprises a segmented electrode, and wherein the second electrode comprises one of a segmented electrode and a continuous electrode.

10. The display element of claim 8, wherein the dielectric material defines the display cell having one of an arch shape and a multi-arch shape.

11. The display element of claim 8, further comprising:

a first dielectric passivation layer between the first electrode and the display cell such that the first electrode is prevented from contacting the fluid with colorant particles; and a second dielectric passivation layer between the second electrode and the display cell such that the second electrode is prevented from contacting the fluid with colorant particles.

12. The display element of claim 8, wherein the dielectric material comprises one of a transparent material, a white material, a dyed material, and a reflective material, and wherein the fluid comprises one of a clear fluid and a colored fluid.

13. A method for fabricating a display element, the method comprising:

providing a first electrode;

providing a first dielectric passivation layer over the first electrode, providing a dielectric material over the first dielectric passivation layer;

structuring the dielectric material to define a display cell comprising a first sidewall that is oblique with respect to the first electrode, a second sidewall that is substantially perpendicular to the first electrode and connected to a first end of the first sidewall, and a third sidewall that is substantially perpendicular to the first electrode and connected to a second end of the first sidewall;

filling the display cell with a fluid with colorant particles;

providing a second electrode over the display cell; and providing a second dielectric passivation layer between the second electrode and the display cell such that the second electrode is prevented from contacting the fluid with colorant particles, wherein the first dielectric passivation layer prevents the first electrode from contacting the fluid with colorant particles.

14. The method of claim 13, wherein structuring the dielectric material comprises one of embossing the dielectric material, molding the dielectric material, and patterning the dielectric material with a photolithographic process.

15. The method of claim 13, wherein structuring the dielectric material comprises structuring the dielectric material to define a display cell comprising at least one curved sidewall.

16. The method of claim 13, wherein structuring the dielectric material comprises structuring the dielectric material to define the display cell comprising at least one reservoir portion adjacent to the first electrode.

17. The method of claim 13, wherein filling the display cell comprises filling the display cell with a colored fluid having white colorant particles.

18. The display element of claim 1, wherein the fluid with colorants directly contacts the first electrode and the second electrode.

19. The display element of claim 1, further comprising:

a first dielectric passivation layer between the first electrode and the display cell such that the first electrode is prevented from contacting the fluid with colorants; and a second dielectric passivation layer between the second electrode and the display cell such that the second electrode is prevented from contacting the fluid with colorants.

20. The display element of claim 8, wherein the fluid with colorant particles directly contacts the first electrode and the second electrode.

* * * * *

UNITED STATES PATENT AND TRADEMARK OFFICE
CERTIFICATE OF CORRECTION

PATENT NO. : 8,184,357 B2  
APPLICATION NO. : 12/815993  
DATED : May 22, 2012  
INVENTOR(S) : Jong-Souk Yeo et al.

Page 1 of 1

It is certified that error appears in the above-identified patent and that said Letters Patent is hereby corrected as shown below:

In the Claims:

In column 20, line 35, in Claim 5, delete "element," and insert -- element --, therefor.

In column 21, line 47, in Claim 13, delete "electrode," and insert -- electrode; --, therefor.

Signed and Sealed this  
First Day of January, 2013

David J. Kappos  
*Director of the United States Patent and Trademark Office*